(12) United States Patent
Watanabe et al.

(10) Patent No.: US 10,295,228 B2
(45) Date of Patent: May 21, 2019

(54) MAGNETIC HEAT PUMP DEVICE

(71) Applicant: DENSO CORPORATION, Kariya, Aichi-pref. (JP)

(72) Inventors: Naoki Watanabe, Kariya (JP); Shigeo Nomura, Kariya (JP); Akito Torii, Kariya (JP); Tsuyoshi Morimoto, Karyia (JP); Takayuki Sugiura, Kariya (JP); Tomoyuki Nomura, Kariya (JP); Yasunori Niiyama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 213 days.

(21) Appl. No.: 15/251,018

(22) Filed: Aug. 30, 2016

(65) Prior Publication Data

US 2017/0059215 A1    Mar. 2, 2017

(30) Foreign Application Priority Data

Sep. 1, 2015    (JP) .................................. 2015-172143

(51) Int. Cl.
*F25B 21/00*    (2006.01)
(52) U.S. Cl.
CPC ...... *F25B 21/00* (2013.01); *F25B 2321/0021* (2013.01); *Y02B 30/66* (2013.01)
(58) Field of Classification Search
CPC ..... F25B 21/00; F25B 30/00; F25B 2321/002
See application file for complete search history.

(56) References Cited

U.S. PATENT DOCUMENTS

| | | | | |
|---|---|---|---|---|
| 2013/0227965 A1* | 9/2013 | Yagi | ........................ | F25B 21/00 62/3.1 |
| 2013/0298571 A1* | 11/2013 | Morimoto | ................ | B60H 1/32 62/3.1 |
| 2013/0327062 A1* | 12/2013 | Watanabe | ................ | F25B 21/00 62/3.1 |
| 2014/0311165 A1* | 10/2014 | Watanabe | ................ | F25B 21/00 62/3.1 |
| 2015/0033763 A1* | 2/2015 | Saito | ........................ | F25B 21/00 62/3.1 |

OTHER PUBLICATIONS

S. Jacobs et al., *The Performance Of A Large-Scale Rotary Magnetic Refrigerator*, Fifth IIF-IIR International Conference on Magnetic Refrigeration at Room Temperature, Thermag V Grenoble, France, Sep. 17-20, 2012, pp. 421-428.

\* cited by examiner

*Primary Examiner* — Brian M King
(74) *Attorney, Agent, or Firm* — Harness, Dickey & Pierce, P.L.C.

(57) ABSTRACT

A controller is configured to, based on a characteristic information of thermal output with respect to a temperature difference between a hot end and a cold end of a working chamber, changes at least one of a flow rate of a heating target fluid in a high temperature heat exchanger and a flow rate of a cooling target fluid in a low temperature heat exchanger. At least one of the flow rate of the heating target fluid in the high temperature heat exchanger and the flow rate of the cooling target fluid in the low temperature heat exchanger is adjusted such that the temperature difference between the hot and cold ends changes in a direction that increases thermal output.

9 Claims, 16 Drawing Sheets

MAGNETIC HEAT PUMP DEVICE

CROSS REFERENCE TO RELATED APPLICATION

The present application is based on Japanese Patent Application No. 2015-172143 filed on Sep. 1, 2015, disclosure of which is incorporated herein by reference.

TECHNICAL FIELD

The present disclosure relates to a magnetic heat pump device that uses the magnetocaloric effect of a magnetic working material.

BACKGROUND

Conventionally, magnetic refrigeration devices are known (see Jacobs et al. below, hereinafter referred to as "the Jacobs device"). In the example of the Jacobs device, a magnetocaloric element is provided in a working chamber, and the thermal output (more specifically, the cold heat) of the device changes according to a temperature difference between the hot and cold ends of the working chamber. According to the Jacobs device, thermal output drops as this temperature difference increases.

PRIOR ART LITERATURE

[Non Patent Literature 1] S. Jacobs, J. Auringer, A. Boeder, J. Chell, L. Komorowski, J. Leonard, S. Russek, C. Zimm. "The performance of a large-scale rotary magnetic refrigerator" in *Fifth IIF-IIR International Conference on Magnetic Refrigeration at Room Temperature (Thermag V)*, p. 421-428 (2012)

SUMMARY

However, Jacobs et al. does not disclose a system control method for when the magnetic heat pump is applied to a heat utilization system of, e.g., an air conditioning device. In order to use the thermal output from the magnetic heat pump device, the two ends of the working chamber may be, for example, connected to a high temperature heat exchanger and a low temperature heat exchanger. In the high temperature heat exchanger, a heat transport medium at the hot end of the working chamber is heated by exchanging heat between the heat transport medium and a heating target fluid. In the low temperature heat exchanger, a cooling target fluid is cooled by exchanging heat between the cooling target fluid and the heat transport medium at the cold end of the working chamber.

When the thermal output from the working chamber is below a target thermal output demanded by the heat utilization system, a countermeasure is needed. A known method here is to increase at least one of the flow rate of the healing fluid in the high temperature heat exchanger and the flow rate of the cooling target fluid in the low temperature heat exchanger. If at least one of the flow rate of the healing fluid and the flow rate of the cooling target fluid is increased, the heat exchange rate of the heat exchanger(s) is increased, and the temperature difference between the two ends of the working chamber decreases. When the temperature difference between the two ends of the working chamber decreases, the thermal output from the working chamber increases due to the previously mentioned relationship between temperature difference and thermal output.

The present inventors encountered a phenomenon in a manufactured magnetic heat pump device where, even if the above described countermeasure is applied when the thermal output is below a target thermal output, this countermeasure is ineffective. That is, even if the flow rate of the healing fluid or the flow rate of the cooling target fluid is increased, the thermal output from the working chamber does not increase. The present inventors extensively studied the root cause of this phenomenon, and recognized that thermal output does not always decrease when the temperature difference between the two ends of the working chamber increases. Based on this observation, the present inventors discovered a configuration that increases thermal output by appropriately controlling the flow rate of the healing fluid or the flow rate of the cooling target fluid.

In view of the above, it is an object of the present disclosure to provide a magnetic heat pump device capable of increasing a thermal output from a working chamber by appropriate performing a flow rate control on a heating target fluid or a cooling target fluid.

In one aspect of the present disclosure, a magnetic heat pump device comprises a magnetocaloric element disposed between a hot end and a cold end of a working chamber, the magnetocaloric element generating a hot heat and a cold heat according to changes in an external magnetic field, a magnetic field modulator that regulates the external magnetic field applied to the magnetocaloric element, a heat transport device that circulates a heat transport medium which exchanges heat with the magnetocaloric element so as to form the hot end and the cold end, a high temperature heat exchanger that uses a hot heat output from the hot end of the working chamber, which is a portion of a thermal output from the working chamber, to heat a heating target fluid by exchanging heat with the heat transport medium, a high temperature flow rate regulator that regulates a flow rate of the heating target fluid in the high temperature heat exchanger, a low temperature heat exchanger that uses a cold heat output from the cold end of the working chamber, which is a portion of the thermal output from the working chamber, to cool a cooling target fluid by exchanging heat with the heat transport medium, a low temperature flow rate regulator that regulates a flow rate of the cooling target fluid in the low temperature heat exchanger, and a controller that controls an operation of the magnetic field modulator, the heat transport device, the high temperature flow rate regulator, and the low temperature flow rate regulator, wherein the controller includes a characteristic information acquisition unit that obtains a characteristic information of the thermal output with respect to a temperature difference between the hot end and the cold end, and a flow rate controller that, when increasing the thermal output, controls the high temperature flow rate regulator and the low temperature flow rate regulator based on the characteristic information obtained by the characteristic information acquisition unit to change at least one of the flow rate of the heating target fluid in the high temperature heat exchanger and the flow rate of the cooling target fluid in the low temperature heat exchanger, such that the temperature difference changes in a direction that increases the thermal output.

Accordingly, the magnetic heat pump device includes the high temperature flow rate regulator that regulates the flow rate of the heating target fluid in the high temperature heat exchanger, the low temperature flow rate regulator that regulates the flow rate of the cooling target fluid in the low temperature heat exchanger, and a controller that controls these devices. The controller includes the characteristic information acquisition unit that obtains the characteristic information of the thermal output with respect to a temperature difference between the hot end and the cold end of the working chamber, and the flow rate controller that controls the high temperature flow rate regulator and the low temperature flow rate regulator based on the characteristic information obtained by the characteristic information acquisition unit. The low rate controller, when increasing the thermal output, changes at least one of the flow rate of the heating target fluid in the high temperature heat exchanger and the flow rate of the cooling target fluid in the low temperature heat exchanger based on the characteristic information, such that the temperature difference changes in a direction that increases the thermal output. Accordingly, when the thermal output from the working chamber is below a target thermal output, by appropriately adjusting at least one of the flow rate of the heating target fluid and the flow rate of the cooling target fluid to change the temperature difference, it is possible to increase the thermal output from the working chamber. In this regard, the thermal output from the working chamber may be increased by performing appropriate flow control on the heating target fluid and the cooling target fluid.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
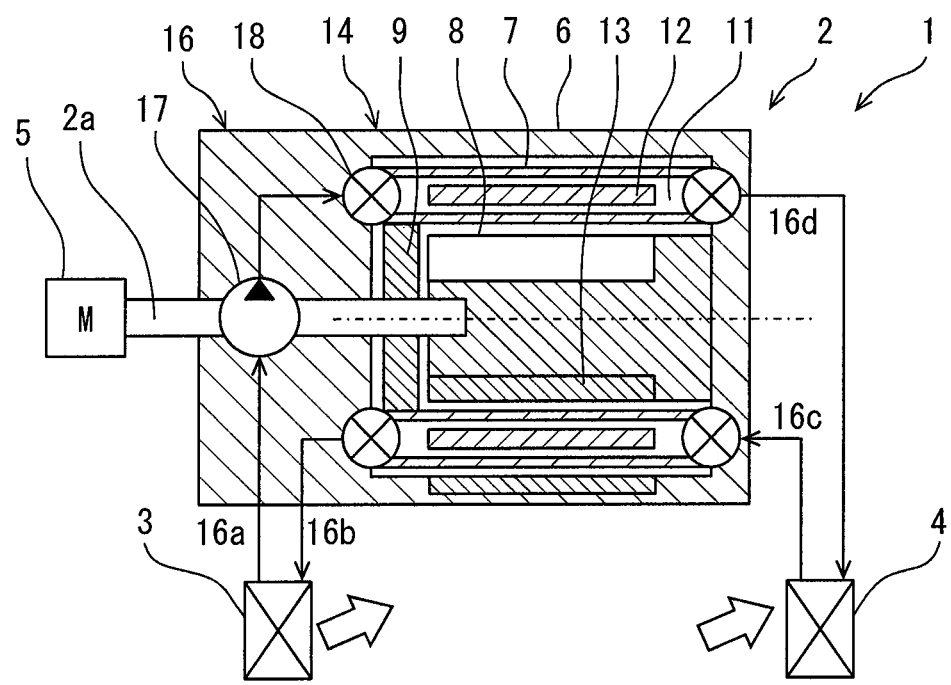
FIG. 1 is a block diagram of a thermal device including a magnetic heat pump device according to a first embodiment.

Hereinafter, a plurality of embodiments in accordance with the present disclosure will be explained with reference to the figures. In each embodiment, portions which correspond to matters explained in preceding embodiments may be denoted with the same reference numeral, and overlapping explanations thereof may be omitted for brevity. If only a portion of the configuration of an embodiment is explained, the other portions of that configuration may be the same as those of preceding embodiments. In addition, the various embodiments are not limited to being combined in manners explicitly described, and a variety of combinations are contemplated as long as no specific problems arise due to those combinations.

First Embodiment

As shown in FIG. 1, a vehicular air conditioning device 1 includes a magnetocaloric heat pump (MHP) device 2 that uses the magnetocaloric effect. The MHP device 2 may simply referred to as a magnetic heat pump device 2. The MHP device 2 provides a thermal-magnetic cycle device.

In this specification, the term "heat pump device" is used in a broad sense. In other words, the term "heat pump device" includes using cold heat from heat pump devices, as well as using hot heat from heat pump devices. A device that uses cold heat may also be referred to as a refrigeration cycle device. Accordingly, the term "heat pump device" as used herein also includes refrigeration cycle devices. Further, "hot" and "cold" as used herein are relative terms, and should not be limited to, e.g., specific temperatures.

The vehicular air conditioning device 1 includes a heat exchanger 3 disposed at a high temperature side of the MHP device 2. The heat exchanger 3 is configured to exchange heat between a hot end of the MHP device 2 and a medium such as air. The heat exchanger 3 is mainly used for heat dissipation. In the illustrated example, the heat exchanger 3 is configured to exchange heat between a heat transport medium of the MHP device 2 and air. The heat exchanger 3 is one of the high temperature system components of the vehicular air conditioning device 1. The heat exchanger 3 may be, for example, disposed within a vehicle cabin to heat air conditioning air through heat exchange. The heat exchanger 3 uses a hot heat output from the hot end of the thermal output from a working chamber 11 to heat a heating target fluid, e.g., air conditioning air. The heat exchanger 3 is a high temperature heat exchanger that heats the heating target fluid by exchanging heat with the heat transport medium.

The vehicular air conditioning device 1 includes a heat exchanger 4 disposed at a low temperature side of the MHP device 2. The heat exchanger 4 is configured to exchange heat between a cold end of the MHP device 2 and a medium such as air. The heat exchanger 4 is mainly used for heat absorption. In the illustrated example, the heat exchanger 4 is configured to exchange heat between the heat transport medium of the MHP device 2 and a heat source medium. The heat exchanger 4 is one of the low temperature system components of the vehicular air conditioning device 1. The heat exchanger 4 may be, for example, disposed outside the vehicle to heat exchange with open air. The heat exchanger 4 uses a cold heat output from the cold end of the thermal output from the working chamber 11 to cool a cooling target fluid, e.g., open air. The heat exchanger 4 is a low temperature heat exchanger that cools the cooling target fluid by exchanging heat with the heat transport medium.

The MHP device 2 includes a rotating shaft 2a for driving the MHP device 2. The rotating shaft 2a is operatively coupled to a motive power source 5. Accordingly, the MHP device 2 is rotatably driven by the motive power source 5. The motive power source 5 provides rotating motive power to the MHP device 2. The motive power source 5 may be the only motive power source of the MHP device 2. The motive power source 5 is a rotating machine such as an electric motor or an internal combustion engine. For example, the motive power source 5 may be an electric motor driven by a battery mounted in the vehicle. Hereinafter, the motive power source 5 may be referred to as a motor.

The MHP device 2 includes a housing 6. The housing 6 rotatably supports the rotating shaft 2a. The MHP device 2 includes a rotor 7. The rotor 7 is rotatably supported inside the housing 6. The rotor 7 either directly or indirectly receives a rotation force from the rotating shaft 2a, and thereby rotates. The rotor 7 is a rotating body that is rotated by the motive power source 5. The rotor 7 is a cylindrical shaped member.

The rotor 7 defines the working chamber 11 through which the heat transport medium flows. One working chamber 11 extends along the axial direction of the rotor 7. One working chamber 11 opens at both end surfaces of the axial direction of the rotor 7. The rotor 7 may include a plurality of working chambers 11. The plurality of working chambers 11 are arranged parallel along the axial direction of the rotor 7. Hereinafter, the rotor 7 may be referred to as a "container" or an "element bed".

The rotor 7 includes a magnetocaloric element 12. The magnetocaloric element 12 may also be referred to as a magnetocaloric effect (MCE) element 12. The MHP device 2 uses the magnetocaloric effect of the MCE element 12. Due to the MCE element 12, the hot end and the cold end of the MHP device 2 are formed. The MCE element 12 is disposed between the hot end and the cold end. In the illustrated example, the left side of the figure is the cold end, and the right side of the figure is the hot end.

The MCE element 12 is arranged in the working chamber 11 to exchange heat with the heat transport medium. The MCE element 12 is fixed to the rotor 7 and retained. The MCE element 12 is arranged along a flow direction of the heat transport medium. The MCE element 12 extends in a long and narrow manner along the axial direction of the rotor 7. The rotor 7 may include a plurality of the MCE elements 12 arranged so as to be separated from each other along the rotation direction of the rotor 7.

The MCE element 12 generates heat or absorbs heat in response to changes in the strength of an external magnetic field. The MCE element 12 generates heat when applied with the external magnetic field, and absorbs heat when the external magnetic field is removed. Specifically, when the external magnetic field is applied to the MCE element 12, the electron spin of the MCE element 12 aligns to the magnetic field direction. As a result, magnetic entropy decreases, and the temperature of the MCE element 12 increases by releasing heat. Further, when the external magnetic field is removed, the electron spin of the MCE element 12 becomes disordered. As a result, magnetic entropy increases, and the temperature of the MCE element 12 decreases by absorbing heat. The MCE element 12 is formed of a magnetic substance that exhibits a high magnetocaloric effect at room temperature levels. For example, the MCE element 12 may be formed of a gadolinium-based material or a lanthanum-iron-silicon compound. In addition, a mixture of lanthanum, iron, phosphorus, and germanium may be used. In addition, the MCE element 12 may be an element that absorbs heat when applied with an external magnetic field, and that generates heat when the external magnetic field is removed.

The MHP device 2 includes a stator 8 positioned to face the rotor 7. The stator 8 is provided by a portion of the housing 6. The stator 8 is disposed radially inward or radially outward of the rotor 7, and includes a radially opposing section that faces the rotor 7 in the radial direction. This radially opposing section is used to provide a magnetic field modulator. The stator 8 is disposed at one or both ends of the rotor 7 in the axial direction, and includes an axially opposing section that faces the rotor 7 in the axial direction. The axially opposing section is used to provide a heat transport device, and more specifically, to provide a flow path switching mechanism.

The MHP device 2 includes a magnetic field modulator 14 and a heat transport device 16 for causing the MCE element 12 to function as an active magnetic refrigeration (AMR) cycle element. The magnetic field modulator 14 is provided by the rotor 7 and the stator 8. The magnetic field modulator 14 periodically increases and decreases a magnetic field due to the relative rotation motion between the stator 8 and the rotor 7. The magnetic field modulator 14 is driven by the rotation motive force applied from the rotating shaft 2a. The heat transport device 16 includes a pump 17 and a flow path switching mechanism 18. The flow path switching mechanism 18 is provided by the rotor 7 and the stator 8. The flow path switching mechanism 18 functions due to the relative rotation motion between the stator 8 and the rotor 7. The flow path switching mechanism 18 switches the connection state between the working chamber 11 and a flow path of the heat transport medium. As a result, the flow path switching mechanism 18 switches a flow direction of the heat transport medium with respect to the working chamber 11 and the MCE element 12, such that the flow direction of the heat transport medium inverts.

The magnetic field modulator 14 applies an external magnetic field to the MCE element 12, and also increases and decreases the strength of that external magnetic field. The magnetic field modulator 14 periodically switches between an excitation state, which positions the MCE element 12 within a strong magnetic field, and a demagnetized state, which positions the MCE element 12 in a weak or zero magnetic field. The magnetic field modulator 14 modules the external magnetic field so as to periodically repeat an excited period, during which the MCE element 12 is positions in the strong external magnetic field, an a demagnetized period, during which the MCE element 12 is positioned in a weaker external magnetic field as compared to the excited period. The magnetic field modulator 14 is synchronized with a reciprocal flow of the heat transport medium, as will be described later, to apply and remove the magnetic field to the MCE element 12. The magnetic field modulator 14 includes a magnetic source 13 which generates the external magnetic field. The magnetic source 13 may be, for example, a permanent magnet or an electromagnet.

Specifically, the magnetic field modulator 14 alternates one working chamber 11 and MCE element 12 between a first position and a second position. The magnetic field modulator 14 positions the MCE element 12 in the first position within a strong magnetic field. The magnetic field modulator 14 positions the MCE element 12 in the second position within a weak or zero magnetic field.

When the heat transport medium is flowing in a first direction along the MCE element 12, the magnetic field modulator 14 positions the MCE element 12 in the first position such as the MCE element 12 is positioned within a strong magnetic field. The first direction is a direction from the cold end to the hot end. When one end of the working chamber 11 is in communication with an inlet of the pump 17 and the other end of the working chamber 11 is in communication with an outlet of the pump 17, the magnetic field modulator 14 positions the MCE element 12 in the first position such that the MCE element 12 in that working chamber 11 is positioned within a strong magnetic field.

When the heat transport medium is flowing in a second direction along the MCE element 12 opposite to the first direction, the magnetic field modulator 14 positions the MCE element 12 in the second position such as the MCE element 12 is positioned within a weak or zero magnetic field. The second direction is a direction from the hot end to the cold end. When the one end of the working chamber 11 is in communication with the outlet of the pump 17 and the other end of the working chamber 11 is in communication with the inlet of the pump 17, the magnetic field modulator 14 positions the MCE element 12 in the second position such that the MCE element 12 in that working chamber 11 is positioned within a weak or zero magnetic field.

The heat transport device 16 includes the heat transport medium for transporting heat which is radiated or absorbed by the MCE element 12, and includes a fluid machine for circulating this heat transport medium. The heat transport device 16 circulates the heat transport medium, which exchanges heat with the MCE element 12, along the MCE element 12. The heat transport device 16 causes the heat transport medium to flow back and forth along the MCE element 12. The heat transport device 16 causes the heat transport medium to flow back and forth in a synchronized manner with the changes in the external magnetic field by the magnetic field modulator 14. The heat transport device 16 changes the flow direction of the heat transport medium in synchronization with the magnetic field modulator 14 increasing and decreasing the magnetic field.

The heat transport medium, which exchanges heat with the MCE element 12, is referred to as a primary medium. The primary medium may be provided as a liquid such as antifreeze, water, or oil. The heat transport device 16 includes the pump 17 for circulating the heat transport medium. The pump 17 is a one-way pump that causes the heat transport medium to flow in one direction. The pump 17 includes an inlet for intaking the heat transport medium, and an outlet for discharging the heat transport medium. The pump 17 is disposed on an annular flow path of the heat transport medium, and causes the heat transport medium to flow in one direction along the annular flow path. The pump 17 is driven by the rotating shaft 2a, and may be, for example, a positive displacement pump.

The heat transport device 16 includes the flow path switching mechanism 18. The flow path switching mechanism 18 switches the flow path of the heat transport medium with respect to one working chamber 11 and one MCE element 12, so as to reverse the flow direction of the heat transport medium with respect to the working chamber 11. In other words, the flow path switching mechanism 18 reverses the placement of the working chamber 11 in terms of the flow direction in the path of the one-way flow of the heat transport medium generated by the one-way pump 17. The flow path switching mechanism 18 alternately positions one working chamber 11 in an outgoing path and a returning path within the annular flow path including the pump 17. The flow path switching mechanism 18 switches a connection relationship between one working chamber 11 and MCE element 12 and the annular flow path including the pump 17 between at least two states. In a first state, the one end of the working chamber 11 is in communication with the inlet of the pump 17, and the other end of the working chamber is in communication with the outlet of the pump 17. In a second state, the one end of the working chamber 11 is in communication with the output of the pump 17, and the other end of the working chamber is in communication with the inlet of the pump 17.

Specifically, the flow path switching mechanism 18 alternately positions one working chamber 11 and MCE element 12 in a first position and a second position. The flow path switching mechanism 18 communicates the working chamber 11, which houses the MCE element 12, with the flow path such that the heat transport medium flows in the first direction along the MCE element 12 in the first position. The flow path switching mechanism 18 communicates the working chamber 11, which houses the MCE element 12, with the flow path such that the heat transport medium flows in the second direction, which is opposite to the first direction, along the MCE element 12 in the second position. The flow path switching mechanism 18 switches the connection state between the flow path of the heat transport medium including the pump 17 and the MCE element 12 (i.e., the working chamber 11) such that the heat transport medium flows back and forth with respect to the MCE element 12.

When one MCE element 12 is in the first position, the flow path switching mechanism 18 connects the working chamber 11, which houses that MCE element 12, with the flow path such that the heat transport medium flows in the first direction along that MCE element 12. When one MCE element 12 is in the first position, the flow path switching mechanism 18 communicates the one end of the working chamber 11, which houses that MCE element 12, with the inlet of the pump 17, and communicates the other end of the working chamber 11 with the outlet of the pump 17.

When one MCE element 12 is in the second position, the flow path switching mechanism 18 connects the working chamber 11, which houses that MCE element 12, with the flow path such that the heat transport medium flows in the second direction, which is opposite to the first direction, along that MCE element 12. When one MCE element 12 is in the second position, the flow path switching mechanism 18 communicates the one end of the working chamber 11, which houses that MCE element 12, with the outlet of the pump 17, and communicates the other end of the working chamber 11 with the inlet of the pump 17.

The MHP device 2 includes a high temperature inlet 16a that receives the heat transport medium from the heat exchanger 3. The high temperature inlet 16a is able to communicate with the inlet of the pump 17. The MHP device 2 includes a high temperature outlet 16b that supplies the heat transport medium to the heat exchanger 3. The high temperature outlet 16b is able to communicate with the one end of the working chamber 11 in the first position. The MHP device 2 includes a low temperature inlet 16c that receives the heat transport medium from the heat exchanger 4. The low temperature inlet 16c is able to communicate with the other end of the working chamber 11 in the first position. The MHP device 2 includes a low temperature outlet 16d that supplies the heat transport medium to the heat exchanger 4. The low temperature outlet 16d is able to communicate with the other end of the working chamber 11 in the second position. The one end of the working chamber 11 in the second position is able to communicate with the outlet of the pump 17.

The rotor 7 retains the MCE element 12, and thus may be also referred to as an "element bed". In the present embodiment, the element bed, which forms the working chamber 11 housing the MCE element 12, is operatively coupled to the rotating shaft 2a. The element bed, which includes the MCE element 12 related to both the flow path switching mechanism 18 and the magnetic field modulator 14, moves due to the rotating shaft 2a. Accordingly, an efficient driving scheme may be achieved.

The pump 17, the flow path switching mechanism 18, and the magnetic field modulator 14 are housed within the common housing 6. Due to this configuration, the pump 17 may be disposed in the vicinity of the flow path switching mechanism 18. For this reason, the pump 17 and the flow path switching mechanism 18 may be connected without needing long piping. As a result, even if the flow path including the pump 17 branches into multiple paths, it is possible to suppress differences in the flow of the heat transport medium. According to this configuration, the flow path in the housing 6 may be used without using piping such as hoses. Accordingly, between the branched flow paths, differences in the flow of the heat transport medium caused by piping is reduced.

A transmission mechanism 9 is disposed between the rotating shaft 2a and the rotor 7. The transmission mechanism 9 may be, for example, a planetary gear train. The transmission mechanism 9 is positioned between the stator 8 and the body of the pump 17. The transmission mechanism 9 controls the rotation speed transmitted from the rotating shaft 2a such that the rotation speed of the pump 17 is higher than the rotation speed of the flow path switching mechanism 18 and the magnetic field modulator 14. Due to this configuration, the rotation speed of the pump 17 is higher than the rotation speed of the flow path switching mechanism 18 and the magnetic field modulator 14. As a result, a high rotation speed type pump 17 may be used. Since the pump 17 rotates at a high speed, the flow rate of the pump 17 may be increased, and the physical size of the pump 17 may be reduced.

The vehicular air conditioning device 1 is mounted on a vehicle, and adjusts the temperature of a passenger cabin of the vehicle. The two heat exchangers 3, 4 are configured as a portion of the vehicular air conditioning device 1. The heat exchanger 3 is a high temperature heat exchanger 3 that reaches a higher temperature than the heat exchanger 4. The heat exchanger 4 is a low temperature heat exchanger 4 that reaches a lower temperature than the heat exchanger 3. The vehicular air conditioning device 1 includes air conditioning related components such as air conditioning ducts and fans for using the high temperature heat exchanger 3 and/or the low temperature heat exchanger 4 for air conditioning.

The vehicular air conditioning device 1 may be used as a cooling device or a heating device. The vehicular air conditioning device 1 may include a cooler that cools air supplied to the cabin, and may include a heater than heats the air cooled by the cooler. The MHP device 2 is used as a cold heat supply source or a hot heat supply source in the vehicular air conditioning device 1. In other words, the high temperature heat exchanger 3 may be used as the above described heater, and the low temperature heat exchanger 4 may be used as the above described cooler.

When the MHP device 2 is used as a hot heat supply source, air passing through the high temperature heat exchanger 3 is supplied into the vehicle cabin and used for heating. At this time, the air passing through the low temperature heat exchanger 4 is expelled to outside of the vehicle cabin. In this case, the heat exchanger 3 is referred to as an internal heat exchanger, and the heat exchanger 4 is referred to as an external heat exchanger.

When the MHP device 2 is used as a cold heat supply source, air passing through the low temperature heat exchanger 4 is supplied into the vehicle cabin and used for cooling. At this time, the air passing through the high temperature heat exchanger 3 is expelled to outside of the vehicle cabin. In this case, the heat exchanger 4 is referred to as an internal heat exchanger, and the heat exchanger 3 is referred to as an external heat exchanger.

The MHP device 2 may also be used as a dehumidifier. In this case, air passes through the low temperature heat exchanger 4, then passes through the high temperature heat exchanger 3, and is then supplied to inside the cabin. The MHP device 2 may be used as a hot heat supply source during wintertime as well as during summertime.

The vehicular air conditioning device 1 shown in FIG. 1 may be, for example, an air conditioner mounted on a vehicle (not illustrated) which is driven by an electric motor as an engine.

The vehicular air conditioning device 1 includes the MHP device 2 disposed within an engine room and a cabin air conditioning unit 20 disposed in a vehicle cabin. The vehicular air conditioning device 1 includes a heat transport medium circuit, in which a heat transport medium may flow outside of the MHP device 2. Hereinafter, the heat transport medium may be referred to as a coolant. Further, the heat transport medium circuit may be referred to as a coolant circuit. The vehicular air conditioning device 1 is configured to be switchable between a coolant circuit of a cooling mode that cools the vehicle cabin, a heating mode that heats the vehicle cabin, and a dehumidification mode that performs dehumidification during, e.g., heating of the vehicle cabin. According, the vehicular air conditioning device 1 may perform cooling, heating, and dehumidification of the vehicle cabin.

The cabin air conditioning unit 20 may be, for example, disposed within an instrument panel at the frontmost region of the vehicle cabin. An air conditioning case 21 forms the outer shell of the cabin air conditioning unit 20. The cabin air conditioning unit 20 houses a ventilator 23, a cooling heat exchanger 24, and a heating heat exchanger 25.

The air conditioning case 21 forms ventilation passages therein for ventilation air to be ventilated into the vehicle cabin. The air conditioning case 21 is elastic to an extent, and is formed of a strong resin such as a polypropylene resin. A recirculation switch box 22 (not illustrated in FIG. 2; see FIG. 3) is disposed at a most-upstream position in the air conditioning case 21 along the ventilation airflow direction. The recirculation switch box 22 selectively intakes inside air (i.e., air in the vehicle cabin) and outside air (i.e., open air from outside the vehicle cabin) to exchange air. Specifically, the recirculation switch box 22 adjusts an intake ratio of inside air and outside air based on a command output from an air conditioning controller 100.

The ventilator 23 is disposed downstream of the recirculation switch box 22 along the airflow direction. The air introduced through the recirculation switch box 22 is ventilated by the ventilator 23 toward the vehicle cabin. The ventilator 23 is an electric ventilator driven by an electric motor, and may be a centrifugal multi-blade fan such as a Sirocco fan. The ventilator 23 is an internal blower than blows air into the vehicle cabin. The rotation speed of the ventilator 23 is controlled by a control voltage command output from a heat pump controller 101. The air volume (specifically, supplied air volume) of the ventilator 23 is controlled by a control voltage command output from a heat pump controller 101. Hereinafter, the ventilator 23 may be referred to as an internal blower.

The cooling heat exchanger 24 is disposed downstream of the ventilator 23 along the airflow direction in the ventilation passage within the air conditioning case 21. The cooling heat exchanger 24 is for cooling the air flowing in the ventilation passage. In addition, the heating heat exchanger 25 is disposed downstream of the cooling heat exchanger 24 along the airflow direction. The heating heat exchanger 25 is for heating the air after passing through the cooling heat exchanger 24. A first bypass passage 21A is formed in the air conditioning case 21 to allow the ventilation air to bypass the cooling heat exchanger 24. A first air mix door 26 is disposed upstream of the cooling heat exchanger 24 along the airflow direction in the ventilation passage within the air conditioning case 21. The first air mix door 26 is an air delivery device that adjusts the amount of ventilation air passing through the cooling heat exchanger 24 and the amount of ventilation air passing through the first bypass passage 21A. The placement position of the first air mix door 26 is not limited to being upstream of the cooling heat exchanger 24 along the airflow direction. The placement position of the first air mix door 26 may be downstream of the cooling heat exchanger 24 along the airflow direction instead.

A second bypass passage 21B is formed in the air conditioning case 21 to allow the ventilation air to bypass the heating heat exchanger 25. A second air mix door 27 is disposed upstream of the heating heat exchanger 25 and downstream of the cooling heat exchanger 24 along the airflow direction in the air conditioning case 21. The second air mix door 27 adjusts the amount of ventilation air passing through the heating heat exchanger 25 and the amount of ventilation air passing through the second bypass passage 21B. The placement position of the second air mix door 27 is not limited to being upstream of the heating heat exchanger 25 along the airflow direction. The placement position of the second air mix door 27 may be downstream of the heating heat exchanger 25 along the airflow direction instead.

A mixing space 21C is defined in the air conditioning case 21. The air that passed through the heating heat exchanger 25, the air that passed through the first bypass passage 21A, and the air that passed through the second bypass passage 21B are mixed at the mixing space 21C.

A plurality of air outlets (not illustrated) are formed at a most-downstream position in the air conditioning case 21 along the airflow direction. The plurality of air outlets blow out the temperature adjusted air from the mixing space 21C into the vehicle cabin, which is the air conditioning target space. The plurality of air outlets include, for example, a face outlet, a foot outlet, and defrost outlet, etc. A respective door (not illustrated) is disposed upstream of each air outlet along the airflow direction to adjust the opening area of each air outlet, thereby forming a blowout mode setting device 28. The blowout mode setting device 28 sets a blowout mode based on a command output from the air conditioning controller 100.

The vehicular air conditioning device 1 includes a high temperature coolant circuit 40 and a low temperature coolant circuit 50. The high temperature coolant circuit 40 is a coolant circulation circuit along which a coolant is discharged from the high temperature outlet 16b of the MHP device 2, guided to a coolant inlet 25a of the heating heat exchanger 25, discharged from a coolant outlet 25b of the heating heat exchanger 25, and returned to the high temperature inlet 16a.

The coolant inlet 25a of the heating heat exchanger 25 is connected to the high temperature outlet 16b. The heating heat exchanger 25 is disposed inside the air conditioning case 21 of the cabin air conditioning unit 20. The heating heat exchanger 25 exchanges heat between the coolant flowing therein and the ventilation air after passing through the cooling heat exchanger 24 to heat that ventilation air. The coolant outlet 25b of the heating heat exchanger 25 is connected to a first three-way valve 41, which is an electric valve. The first three-way valve 41 is a flow path switching device whose operation is controlled by a control signal output from the heat pump controller 101. The first three-way valve 41, in accordance with the control signal from the heat pump controller 101, switches between a coolant circuit that connects the coolant outlet 25b with the high temperature inlet 16a, and a coolant passage that connects between the coolant outlet 25b and a dissipation inlet 61a of an absorption-dissipation heat exchanger 60.

The absorption-dissipation heat exchanger 60 is disposed in the engine room, and is an external heat exchanger that exchanges heat between a coolant flowing therein and open air. The absorption-dissipation heat exchanger 60 is comprised of two heat exchange sections: a heat dissipation portion 61 that circulates coolant flowing out of the heating heat exchanger 25, and a heat absorption portion 62 that circulates coolant discharged from the low temperature outlet 16d of the MHP device 2. An external fan 63, which adjusts the amount of open air flowing to the heat dissipation portion 61 and the heat absorption portion 62, is linked to the absorption-dissipation heat exchanger 60.

The heat dissipation portion 61 of the absorption-dissipation heat exchanger 60 is a heat exchanger unit that exchanges heat between open air and coolant flowing in from the dissipation inlet 61a. Further, the heat absorption portion 62 of the absorption-dissipation heat exchanger 60 is a heat exchanger unit that exchanges heat between open air and coolant flowing in from an absorption inlet 62a. In addition, the coolant circuits of the heat dissipation portion 61 and the heat absorption portion 62 are configured to be independent from each other, such that the coolant flowing in the heat dissipation portion 61 and the coolant flowing in the heat absorption portion 62 are not mixed together in the absorption-dissipation heat exchanger 60. A dissipation outlet 61b of the absorption-dissipation heat exchanger 60 is connected to the high temperature inlet 16a of the MHP device 2. After the coolant is heat dissipated in the absorption-dissipation heat exchanger 60, the coolant returns through the dissipation outlet 61b to the working chamber 11 of the MHP device 2.

Accordingly, the high temperature coolant circuit 50 includes two coolant circulation circuits. The first circulation circuit circulates coolant from the high temperature outlet 16b, to the heating heat exchanger 25, to the first three-way valve 41, then to the high temperature inlet 16a in this order. The other circulation circuit circulates coolant from the high temperature outlet 16b, to the heating heat exchanger 25, to the first three-way valve 41, to the heat dissipation portion 61 of the absorption-dissipation heat exchanger 60, then to the high temperature inlet 16a in this order.

Further, a reservoir tank 43 is connected to between the heating heat exchanger 25 and the first three-way valve 41 in the high temperature coolant circuit 40. The reservoir tank 43 regulates the amount of coolant in the high temperature coolant circuit 40 through a fixed throttle 42. The fixed throttle 42 may be implemented as, for example, an orifice or a capillary tube.

The low temperature coolant circuit 50 is a coolant circulation circuit along which a coolant is discharged from the low temperature outlet 16d of the MHP device 2, guided to a coolant inlet 24a of the cooling heat exchanger 24, discharged from a coolant outlet 24b of the cooling heat exchanger 24, and returned to the low temperature inlet 16c. A second three-way valve 51, which is an electric valve, is connected to the low temperature outlet 16d. The second three-way valve 51 is, similar to the first three-way valve 41, a flow path switching device whose operation is controlled by a control signal output from the heat pump controller 101.

The second three-way valve 51, in accordance with the control signal from the heat pump controller 101, switches between a coolant circuit that connects the low temperature outlet 16d with an absorption inlet 62a of the absorption-dissipation heat exchanger 60, and a coolant circuit that connects the low temperature outlet 16d with a third three-way valve 52, which is an electric valve. The third three-way valve 52 is connected to the second three-way valve 51, which is in turn connected to an absorption outlet 62b of the absorption-dissipation heat exchanger 60. The third three-way valve 52 is, similar to the first and second three-way valves 41 and 51, a flow path switching device whose operation is controlled by a control signal output from the heat pump controller 101.

The third three-way valve 52 is configured so as to be operatively coupled with the second three-way valve 51. In other words, when the second three-way valve 51 is switched to the coolant circuit that connects the low temperature outlet 16d with the third three-way valve 52, the third three-way valve 52 switches to a coolant circuit that connects the second three-way valve 51 with the coolant inlet 24a of the cooling heat exchanger 24. Further, when the second three-way valve 51 switches to the coolant circuit that connects the low temperature outlet 16d with the absorption inlet 62a of the absorption-dissipation heat exchanger 60, the third three-way valve 52 switches to a coolant circuit that connects the second three-way valve 51 with the low temperature inlet 16c.

The cooling heat exchanger 24, which is connected to the third three-way valve 52, is disposed upstream of the heating heat exchanger 25 along the ventilation airflow direction within the air conditioning case 21 of the cabin air conditioning unit 20. The cooling heat exchanger 24 is a heat exchanger that exchanges heat between a coolant flowing therein and ventilation air to cool the ventilation air. Further, the coolant outlet 24b of the cooling heat exchanger 24 is connected to the low temperature inlet 16c.

In this regard, the low temperature coolant circuit 50 is comprised of two coolant circulation circuits. The first is a circulation circuit that circulates coolant from the low temperature outlet 16d, to the second three-way valve 51, to the third three-way valve 52, to the cooling heat exchanger 24, then to the low temperature inlet 16c in this order. Another is a circulation circuit that circulates coolant from the low temperature outlet 16d, to the heat absorption portion 62 of the absorption-dissipation heat exchanger 60, to the second three-way valve 51, to the third three-way valve 52, then to the low temperature inlet 16c in this order.

It should be noted that the second three-way valve 51 and the third three-way valve 52 may be not operatively coupled as well. In addition to the above described two coolant circulation circuits, another circulation circuit may be configured to circulate coolant from the low temperature outlet 16d, to the heat absorption portion 62 of the absorption-dissipation heat exchanger 60, to the second three-way valve 51, to the third three-way valve 52, to the cooling heat exchanger 24, then to the low temperature inlet 16c in this order.

Further, a reservoir tank 54 is connected to between the second three-way valve 51 and the third three-way valve 52 in the low temperature coolant circuit 50. The reservoir tank 54 adjusts the amount of coolant in the low temperature coolant circuit 50 through a fixed throttle 53. The fixed throttle 53 may be implemented as, for example, an orifice or a capillary tube.

Figure 2:
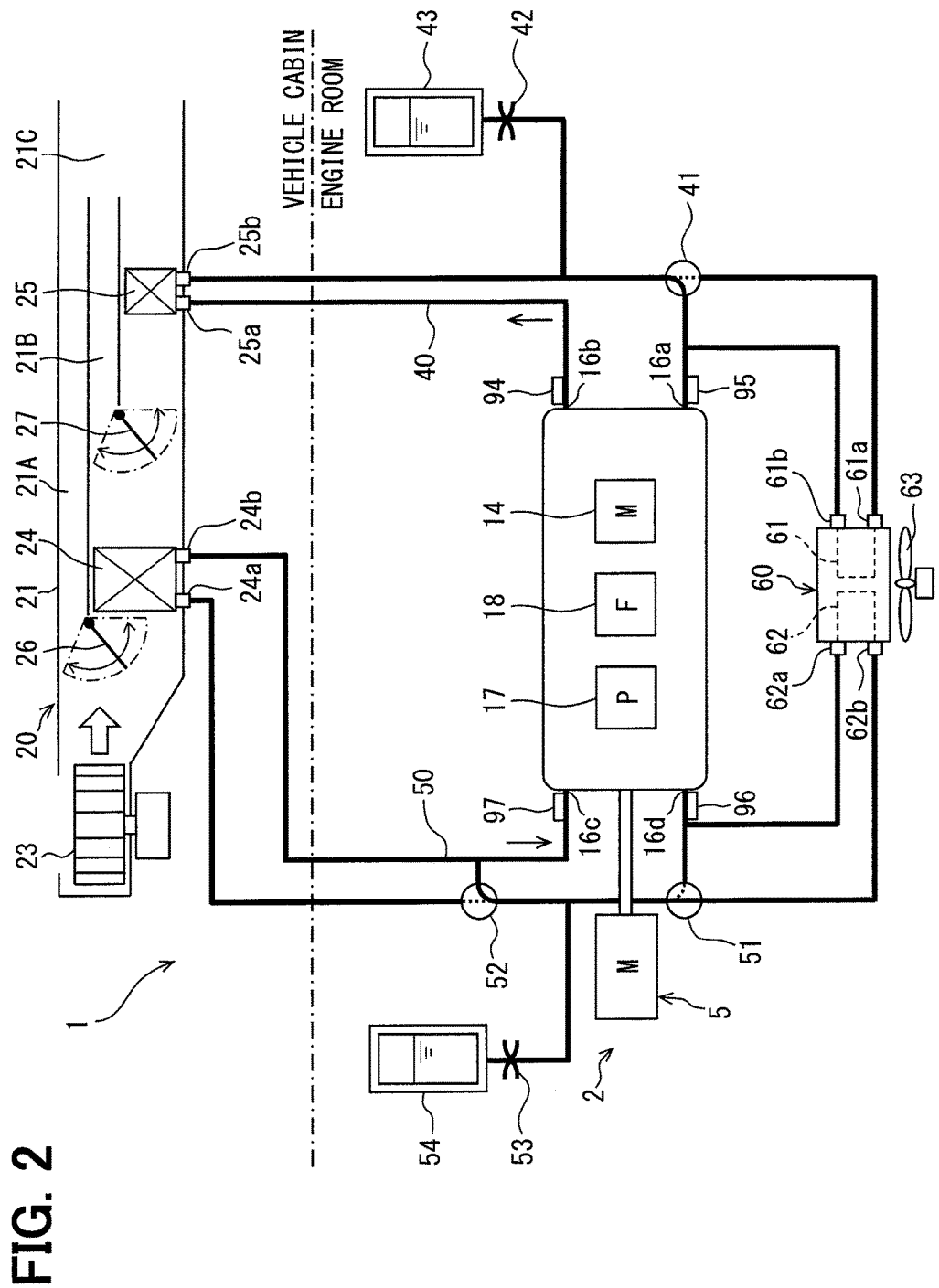
FIG. 2 is a summary configuration view of a vehicular air conditioning device including a magnetic heat pump device according to a first embodiment.

As shown in FIG. 2, a temperature sensor 94 is disposed at the high temperature outlet 16b of the MHP device 2 to detect the temperature of the heat transport medium flowing out from the high temperature outlet 16b. The temperature sensor 94 detects a temperature Th1 of the heat transport medium flowing out from the hot end of the working chamber 11 prior to being heat exchanged at the heating heat exchanger 25 or the heat dissipation portion 61. The temperature sensor 94 is a hot end temperature detector. A temperature sensor 95 is disposed at the high temperature inlet 16a of the MHP device 2 to detect of the heat transport medium flowing into the high temperature inlet 16a. The temperature sensor 95 detects a temperature Th2 of the heat transport medium when returning to the hot end of the working chamber 11 after being heat exchanged at the heating heat exchanger 25 or the heat dissipation portion 61. The temperature sensors 94 and 95 are a pair of high temperature sensors that detect the temperature of the heat transport medium both before and after heat exchange with the heating target fluid at the high temperature heat exchanger 3. This pair of high temperature sensors provide a temperature difference detector that detects a temperature difference of the heat transport medium before and after heat exchange with the heating target fluid at the high temperature heat exchanger 3.

A temperature sensor 96 is disposed at the low temperature outlet 16d of the MHP device 2 to detect the temperature of the heat transport medium flowing out from the low temperature outlet 16d. The temperature sensor 96 detects a temperature Tc1 of the heat transport medium flowing out of the cold end of the working chamber 11 prior to heat exchange at the cooling heat exchanger 24 or the heat absorption portion 62. The temperature sensor 96 is a cold end temperature detector. A temperature sensor 97 is disposed at the low temperature inlet 16c of the MHP device 2 to detect the temperature of the heat transport medium flowing into the low temperature inlet 16c. The temperature sensor 97 detects a temperature Tc2 of the heat transport medium when returning to the cold end of the working chamber 11 after being heat exchanged at the cooling heat exchanger 24 or the heat absorption portion 62. The temperature sensors 96 and 97 form a pair of low temperature sensors that detect the temperature of the heat transport medium both before and after heat exchange with the cooling target fluid at the low temperature heat exchanger 4. This pair of low temperature sensors provide a temperature difference detector that detects a temperature difference of the heat transport medium both before and after heat exchange with the cooling target fluid at the low temperature heat exchanger 4.

Figure 3:
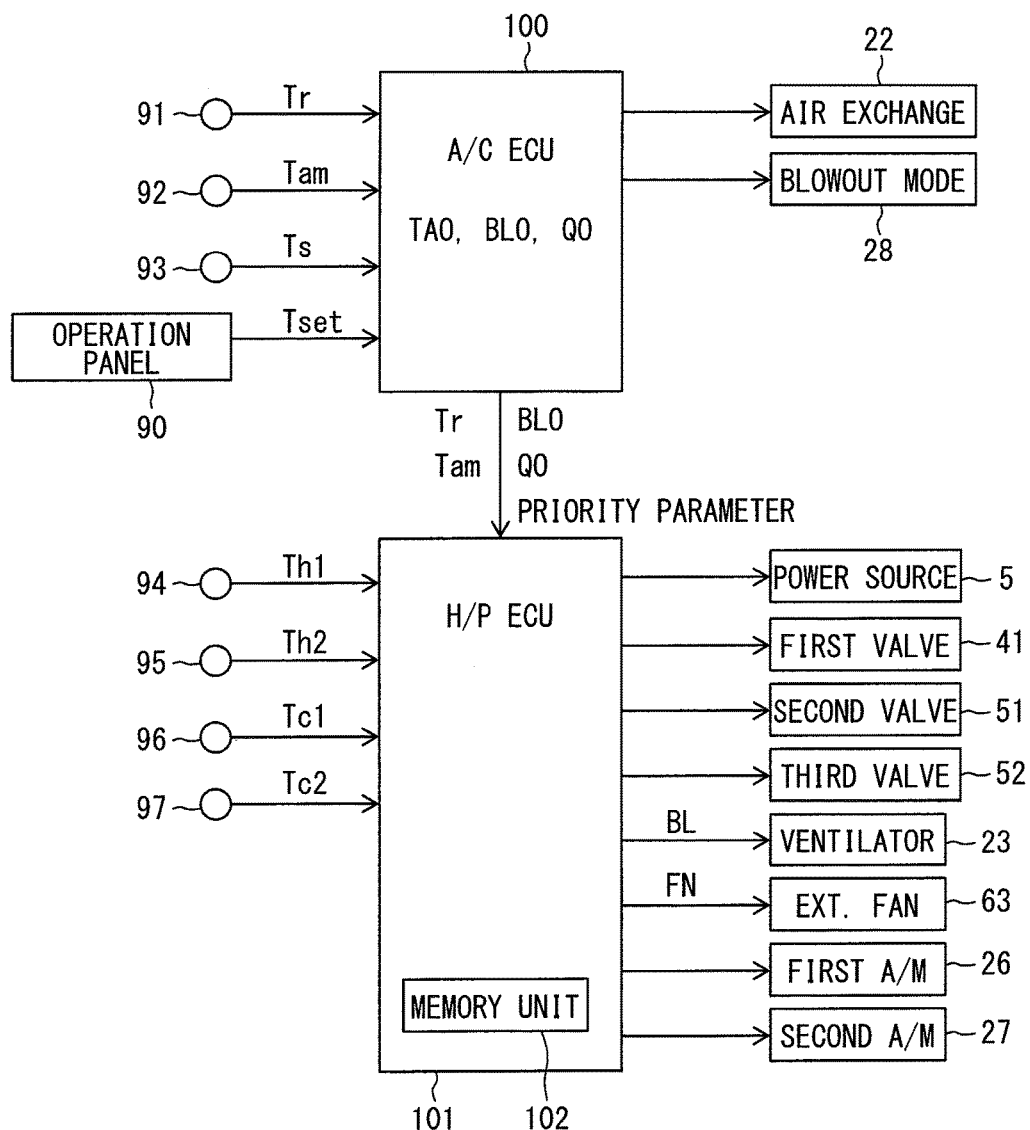
FIG. 3 is a blocking diagram showing a control system configuration of a magnetic heat pump device according to a first embodiment.

As shown in FIG. 3, the control system of the vehicular air conditioning device 1 includes the air conditioning controller 100 and the heat pump controller 101. The air conditioning controller 100 is a higher-level controller of the heat pump controller 101. The air conditioning controller 100 outputs various commands and data (i.e., information) to the heat pump controller 101. The control system of the vehicular air conditioning device 1 is not limited to having these two controllers. For example, only a single controller may be provided. Hereinafter, the air conditioning controller 100 and the heat pump controller 101 may be referred to as "ACECU" (air conditioning electronic control unit) and "HPECU" (heat pump electronic control unit), respectively.

Each of the air conditioning controller 100 and the heat pump controller 101 are configured from a microcomputer including a CPU, a ROM, and a RAM, as well as peripheral circuitry. The input side of the air conditioning controller 100 is connected to an internal temperature sensor 91, an external temperature sensor 92, a solar radiation sensor, and a operation panel 90. The internal temperature sensor 91 outputs air temperature information of inside the vehicle cabin. The external temperature sensor 92 outlets air temperature data of outside the vehicle cabin. The solar radiation sensor 93 outputs data on the amount of solar radiation entering the vehicle cabin. The operation panel 90 is positioned near the instrument panel at the front of the vehicle cabin, and includes various air conditioning control switches. The control signals from those control switches are input to the air conditioning controller 100. For example, the operation panel 90 includes an operation switch for the vehicular air conditioning device 1, an auto switch, an air conditioning operation mode setting switch, a cabin temperature setting switch, etc.

The air conditioning controller 100 performs a variety of operations and processing based on control programs stored in its ROM, and controls the operation of the recirculation switch box 22, the blowout mode setting device 28, etc., which are connected to the output side of the air conditioning controller 100. Further, the air conditioning controller 100 outputs signals, such as command signals, to the heat pump controller 101.

The temperature sensors 94, 95, 96, 97 are connected to the input side of the heat pump controller 101. The temperature sensors 94, 95, 96, 97 output information signals on each of their detected temperatures Th1, Th2, Tc1, Tc2. The heat pump controller 101 performs a variety of operations and processing based on control programs stored in its ROM based on the command signals from the air conditioning controller 100, the input signals from the temperature sensors 94, 95, 96, 97, etc. The heat pump controller 101 controls the operation of components connected to the output side of the heat pump controller 101. These components include the motive power source 5, the first three-way valve 41, the second three-way valve 51, the third three-way valve 52, the ventilator 23, the external fan 63, the first air mix door 26, and the second air mix door 27.

According to the vehicular air conditioning device 1, the heat pump controller 101 sets an air conditioning operation mode based on at least one of air conditioning operation mode setting switch data from the operation panel 90 and control processing by the air conditioning controller 100. The air conditioning operation mode set by the heat pump controller 101 may be, for example, a cooling operation mode, a heating operation mode, or a dehumidification operation mode.

In the cooling operation mode, due to a control signal from the heat pump controller 101, the first three-way valve 41 in the high temperature coolant circuit 40 switches to the coolant circuit that connects the coolant outlet 25b of the heating heat exchanger 25 with the dissipation inlet 61a of the absorption-dissipation heat exchanger 60. In addition, in the low temperature coolant circuit 50, the second three-way valve 51 switches to the coolant circuit that connects the low temperature outlet 16d to the third three-way valve 52, and the third three-way valve 52 switches to the coolant circuit that connects the second three-way valve 51 with the coolant inlet 24a of the cooling heat exchanger 24. In addition, the second air mix door 27 blocks the heating heat exchanger 25 to prevent heat dissipation by the heating heat exchanger 25.

As a result of the above, in the cooling operation mode, the heat dissipation portion 61 of the absorption-dissipation heat exchanger 60 functions as the high temperature heat exchanger 3, and the cooling heat exchanger 24 functions as the low temperature heat exchanger 4. In the cooling operation mode, heat is transported from the cooling heat exchanger 24 to the heat dissipation portion 61 through the MHP device 2. In the cooling operation mode, the cold heat output from the cold end of the working chamber 11, which is a portion of the thermal output from the working chamber 11, is used to cool the ventilation air, i.e., the cooling target fluid, in the cooling heat exchanger 24. In addition, the hot heat output from the hot end of the working chamber 11, which is a portion of the thermal output from the working chamber 11, is used to heat the outside air, i.e., the heating target fluid, at the heat dissipation portion 61.

In the heating operation mode, due to the control signal from the heat pump controller 101, the first three-way valve 41 in the high temperature coolant circuit 40 switches to the coolant circuit connecting the coolant output 25b with the high temperature inlet 16a. In addition, in the low temperature coolant circuit, the second three-way valve 51 switches to the coolant circuit connecting the low temperature outlet 16d with the absorption inlet 62a of the absorption-dissipation heat exchanger 60, and the third three-way valve 52 switches to the coolant circuit connecting the second three-way valve 51 with the low temperature inlet 16c.

Due to the above, in the heating operation mode, the heating heat exchanger 25 functions as the high temperature heat exchanger 3, and the heat absorption portion 62 of the absorption-dissipation heat exchanger 60 functions as the low temperature heat exchanger 4. In the heating operation mode, heat from the heat absorption portion 62 is transported to the heating heat exchanger 25 through the MHP device 2. In the heating operation mode, the hot heat output from the hot end of the working chamber 11, which is a portion of the thermal output of the working chamber 11, is used to heat the ventilation air, i.e., the heating target fluid, in the heating heat exchanger 25. In addition, the cold heat output from the cold end of the working chamber 11, which is a portion of the thermal output of the working chamber 11, is used to cool the outside air, i.e., the cooling target fluid, at the heat absorption portion 62.

Further, in the dehumidification operation mode, due to the control signal from the heat pump controller 101, the first three-way valve 41 in the high temperature coolant circuit 40 switches to the coolant circuit connecting the coolant outlet 25b with the high temperature inlet 16a. Further, in the low temperature coolant circuit 50, the second three-way valve 51 switches to the coolant circuit connecting the low temperature outlet 16d with the third three-way valve 52, and the third three-way valve 52 switches to the coolant circuit connecting the second three-way valve 51 with the coolant inlet 24a.

Due to the above, in the dehumidification operation mode, the heating heat exchanger 25 functions as the high temperature heat exchanger 3, and the cooling heat exchanger 24 functions as the low temperature heat exchanger 4. In the dehumidification operation mode, heat from the cooling heat exchanger 24 is transported to the heating heat exchanger 25 through the MHP device 2. In the dehumidification operation mode, the cold heat output from the cold end of the working chamber 11, which is a portion of the thermal output from the working chamber 11, is used to cool the ventilation air, i.e., the cooling target fluid, in the cooling heat exchanger 24. Further, the hot heat output from the hot end of the working chamber 11, which is a portion of the thermal output of the working chamber 11, is used to heat the ventilation air, i.e., the heating target fluid, in the heating heat exchanger 25.

In addition, during a dehumidification heating operation mode (i.e., a mode in which dehumidification is performed along with heating), due to the control signal from the heat pump controller 101, the first three-way valve 41 in the high temperature coolant circuit 40 switches to the coolant circuit connecting the coolant outlet 25b with the high temperature inlet 16a. In addition, in the low temperature coolant circuit 50, the second three-way valve 51 switches to the coolant circuit connecting the low temperature outlet 16d with the absorption inlet 62a of the absorption-dissipation heat exchanger 60, and the third three-way valve 52 switches to the coolant circuit connecting the second three-way valve 51 with the coolant inlet 24a.

Due to this, during the dehumidification heating operation mode, the heating heat exchanger 25 functions as the high temperature heat exchanger 3, while the cooling heat exchanger 24 and the heat absorption portion 62 function together as the low temperature heat exchanger 4. In the dehumidification heating operation mode, heat from the cooling heat exchanger 24 and the heat absorption portion 62 is transported to the heating heat exchanger 25 through the MHP device 2. In the dehumidification heating operation mode, the cold heat output from the cold end of the working chamber 11, which is a portion of the thermal output from the working chamber 11, is used to cool the ventilation air, i.e., the cooling target fluid, in the cooling heat exchanger 24 and used to cool the outside air, which is also the cooling target fluid, in the heat absorption portion 62. Further, the hot heat output from the hot end of the working chamber 11, which is a portion of the thermal output of the working chamber 11, is used to heat the ventilation air, i.e., the heating target fluid, in the heating heat exchanger 25.

In this regard, according to the vehicular air conditioning device 1, the hot heat and the cold heat from the hot and cold ends of the working chamber 11 of the MHP device 2 may be used in air conditioning the vehicle cabin in each of the operation modes.

The air conditioning controller 100 sets control target values based on input data from various sensors, setting switches, etc., during an automatic mode in which automatic air conditioning is performed. The automatic mode may be enabled when, for example, an auto switch in the operation panel 90 is switched on. The air conditioning controller 100 may, for example, receive a set temperature Tset signal which is set by the temperature setting switch in the operation panel 90. In addition, the air conditioning controller 100 receives an internal temperature (room temperature) Tr signal from the internal temperature sensor 91, an external temperature (atmospheric temperature) Tam signal from the external temperature sensor, and a solar radiation data Ts signal from the solar radiation sensor 93. The solar radiation data Ts is temperature data corresponding to a temperature rise caused by solar radiation. Based on these input data, the air conditioning controller 100 sets a target air temperature TAO, a target air volume BLO, and a target thermal output QO. The target air temperature TAO is a target value for the temperature of the air blown into the vehicle cabin. The target air volume BLO is a target value for the amount of air blown into the vehicle cabin. The target thermal output QO is a target value for the thermal output from the MHP device 2.

It should be noted that as long as two of these three control target values are known, the remaining third control value can be naturally derived. Accordingly, the air conditioning controller 100 may output only two of these control target values as command values to the lower-level controller, i.e., the heat pump controller 101. In addition, there is a chance that two of the control target values cannot be simultaneously achieved due to, e.g., performance limitations of the MHP device 2. In this case, the air conditioning controller 100 may output priority parameters indicating the priority levels for achieving the two control target values. Further, the air conditioning controller 100 also outputs its input data where needed for the heat pump controller 101 to control the operation of the MHP device 2 and such.

In addition, the air conditioning controller 100 controls the operations of the recirculation switch box 22 and the blowout mode setting device 28 based on, for example, the calculated target air temperature TAO. However, if a user manually sets an outside air intake mode or a blowout mode using the operation panel 90, then regardless of the target air temperature TAO, the air conditioning controller 100 sets the mode according to the manually switch settings.

The heat pump controller 101 receives command value data and such from a higher-level controller, i.e., the air conditioning controller 100. In addition, the heat pump controller 101 receives the temperature information on the heat transport medium from the temperature sensors 94, 95, 96, 97. In addition to this input data, the heat pump controller 101 controls a plurality of control target components based thermal output characteristic information pre-stored in a memory unit 102. The memory unit 102 may be provided by the ROM or such.

Figure 6:
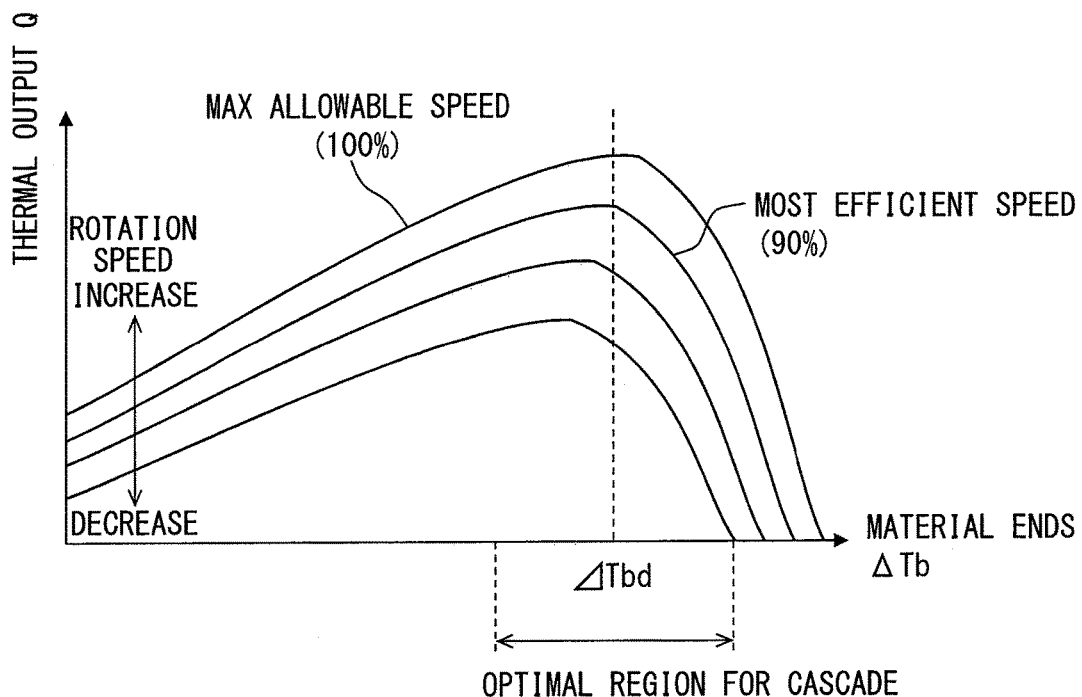
FIG. 6 is a graph showing an exemplary characteristic information of thermal output with respect to temperature difference.

The memory unit 102 has stored thereon characteristic information of a thermal output Q with respect to a temperature difference $\Delta Tb$ between the hot and cold ends of the working chamber 11, for example as shown in FIG. 6. The temperature difference between the hot end and the cold end of the working chamber 11 is equal to the temperature difference between the hot end and the cold end of the MCE element 12. Here, the MCE element 12 is a magnetocaloric effect material. As shown in FIG. 6, as the rotation speed of the motor 5 (i.e., the motive power source) changes, the thermal output Q also changes. When the rotation speed of the motor 5 is increased, the heat pump operation cycle frequency increases due to the magnetic field modulator 14 and the flow path switching mechanism 18. At the same time, the flow rate of the heat transport medium due to the pump 17 increases proportionally with the operation cycle frequency, and the thermal output Q increases.

When assuming the rotation speed of the motor 5 is constant, the thermal output Q also changes as the temperature difference $\Delta Tb$ changes. As shown in the thermal output characteristic example of FIG. 6, at each rotation speed of the motor 5, the thermal output Q increases as the temperature difference $\Delta Tb$ increases in one region, while the thermal output Q decreases as the temperature difference $\Delta Tb$ increases in another region. A first characteristic region of the present embodiment is defined as the region to the right side of the peaks of the characteristic lines in FIG. 6, where the thermal output Q decreases as the temperature difference $\Delta Tb$ increases. In addition, a second characteristic region of the present embodiment is defined as the region to the left of the peaks of the characteristic lines, where the thermal output Q increases as the temperature difference $\Delta Tb$ increases.

Figure 7:
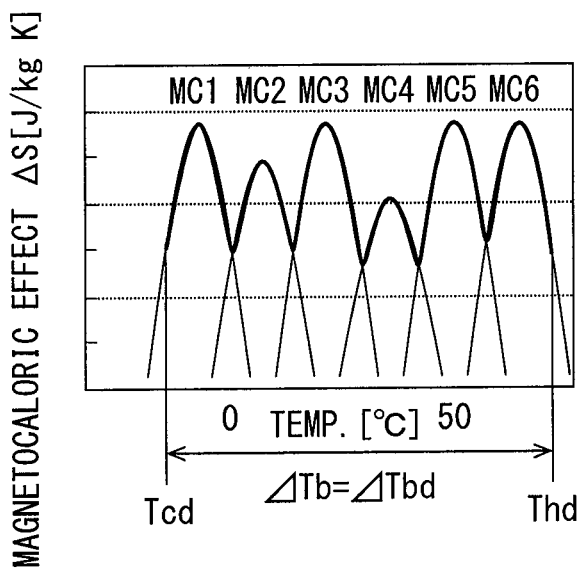
FIG. 7 is a graph explaining an example where magnetocaloric effect materials are arranged in a cascade and each material component exhibits maximum performance.
Figure 8:
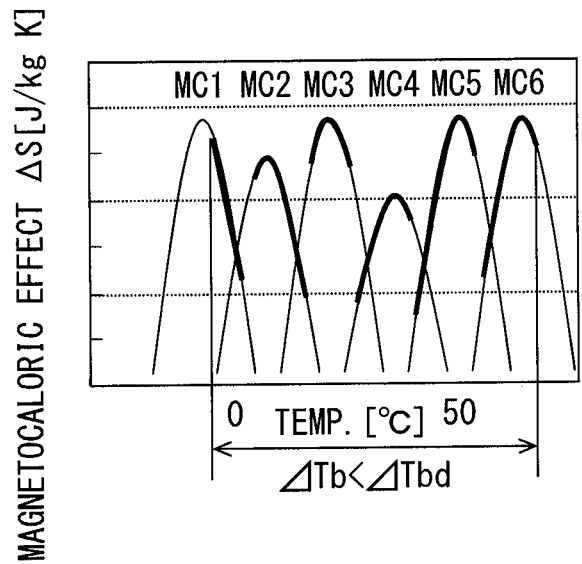
FIG. 8 is a graph explaining an example where magnetocaloric effect materials are arranged in a cascade and each material component does not exhibit maximum performance.

The reasons for the thermal output Q changing according to the temperature difference $\Delta Tb$ will be explained below. As shown in FIG. 7, when the MCE element 12 is comprised of a plurality of magnetocaloric effect materials having different curie temperatures in a cascade arrangement, each material component exhibits peak performance at an ideal temperature difference $\Delta Tbd$. The ideal temperature difference $\Delta Tbd$ may be referred to as a design temperature difference. For example, as shown in FIG. 8, when the temperature difference $\Delta Tb$ is smaller than the ideal temperature difference $\Delta Tbd$, not every material component is exhibiting sufficient performance. As designed, the ideal temperature difference $\Delta Tbd$ is the difference between an ideal hot end temperature Thd and an ideal cold end temperature Tcd. In the characteristic lines shown in FIG. 6, the highest operational efficiency characteristic line is shown as having a maximum thermal output Q when the temperature difference between the two ends of the working chamber 11 is the ideal temperature difference $\Delta Tbd$. In the illustrated example, the highest operational efficiency characteristic line is shown as the characteristic line for when the rotation speed of the motor 5 is at 90% of its maximum allows rotation speed. As illustrated in FIG. 6, the temperature difference $\Delta Tb$ where thermal output Q is maximized, i.e., the peaks of the characteristic lines, is different for each characteristic line, i.e., for different rotation speeds of the motor 5. As the rotation speed of the motor 5 increases, the temperature difference $\Delta Tb$ where thermal output Q is maximized gradually increases.

Also as illustrated, in order to increase thermal output Q, the temperature difference $\Delta Tb$ should be controlled to approach the ideal temperature difference $\Delta Tbd$. To efficiently obtain thermal output Q, the temperature difference $\Delta Tb$ is preferably centered on the ideal temperature difference $\Delta Tbd$, which is the preferred operating region of the cascade. A thermal output characteristic map such as the example shown in FIG. 6 is stored in advance on the memory unit 102. The thermal output characteristic information stored in the memory unit 102 is not limited to the exemplary characteristic map of FIG. 6. For example, data representing the first characteristic region (wherein thermal output Q decreases as temperature difference $\Delta Tb$ increases) and the second characteristic region (wherein thermal output increases as temperature difference $\Delta Tb$ increases) may be stored for each rotation speed of the motor 5, without storing thermal output Q values. As another example, the first characteristic region and the second characteristic region may be stored for a plurality of rotation speeds of the motor 5, and values for other rotation speeds may be interpolated from the stored data.

Next, the control operation of the heat pump controller 101 when the vehicular air conditioning device 1 is set to the heating operation mode will be explained. Here, the following explanation is directed toward an example where the heat pump controller 101 receives the target air volume BLO, the target thermal output QO, and priority parameters from the air conditioning controller 100. In addition, the air conditioning controller 100 outputs the internal temperature Tr and the external temperature Tam to the heat pump controller 101.

Figure 4:
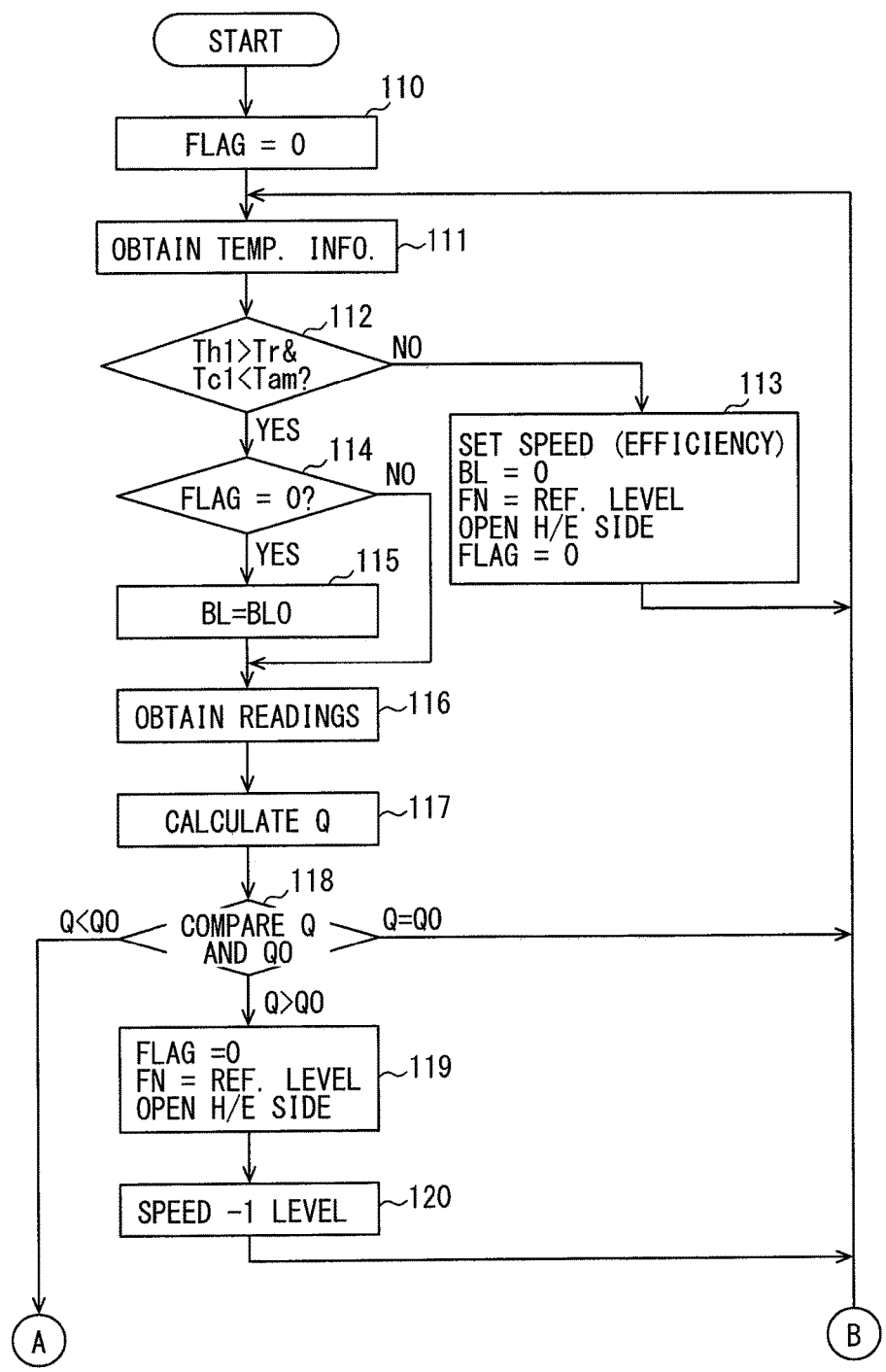
FIG. 4 is a flow chart showing a portion of a control operation of a magnetic heat pump device according to a first embodiment.

As shown in FIG. 4, when the heat pump controller 101 receives a heating operation start command from the air conditioning controller 100, the heat pump controller 101 first sets a blower flag to 0 at step 110. The blower flag represents whether an air volume BL, which is a command output value for the ventilator 23, is based on the target air volume BLO. When the air volume BL of the ventilator 23 is controlled to match the target air volume BLO, the blower flag is set to 0. Conversely, when the air volume BL of the ventilator 23 is controlled to be a particular value with no concern for the target air volume BLO, the blower flag is set to 1.

When beginning the heating operation, the heat pump controller 101 positions the first air mix door 26 to fully close the first bypass passage 21A and fully open the path to the cooling heat exchanger 24. In addition, the second air mix door 27 is positioned to fully close the second bypass passage 21B to fully open the path to the heating heat exchanger 25.

After performing step 110, the heat pump controller 101 obtains temperature information at step 111. At step 111, the internal temperature Tr and the external temperature Tam are obtained from the air conditioning controller 100, and the heat transport medium temperatures Th1, Tc1 are obtained from the temperature sensors 94, 96.

After performing step 111, at step 112, a comparison is made between the temperature Th1 and the internal temperature Tr, and a comparison is made between the temperature Tc1 and the external temperature Tam. At step 112, it is determined whether the temperature Th1 is higher than the internal temperature Tr and the temperature Tc1 is lower than the external temperature Tam. At step 112, the relationship between the temperature Th1 and the internal temperature Tr determines whether heat can be dissipated from the heat transport medium to the ventilation air at the heating heat exchanger 25. In addition, the relationship between the temperature Tc1 and the external temperature Tam determines whether heat can be absorbed by the heat transport medium from outside air at the heat absorption portion 62.

Figure 9:
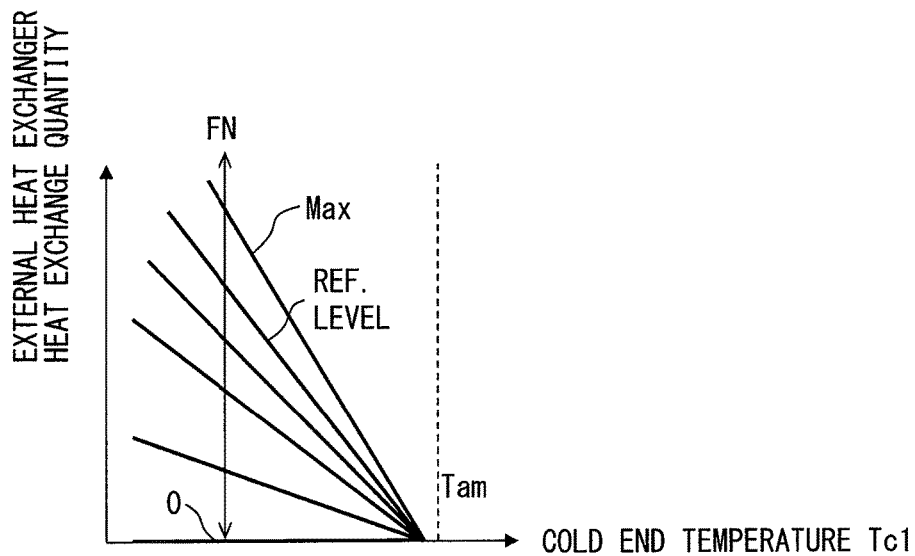
FIG. 9 is a graph showing a relationship between heat exchange amount at an external heat exchanger and airflow rate to the external heat exchanger.

If the determination at step 112 is "NO", the operation continues to step 113. At step 113, the rotation speed of the motive power source 5 is set to a particular value based on, for example, efficiency. In the present embodiment, a highest operational efficiency rotation speed equal to 90% of the maximum allowed rotation speed is used. In addition, the air volume BL of the internal blower 23 is set to 0. Further, the external fan 63 is controlled such that an external airflow rate FN toward the heat absorption portion 62 is at a reference level. The reference level may be, for example as shown in FIG. 9, a particular air volume smaller than a maximum external air volume. As shown in FIG. 9, when the temperature of the heat transport medium at the cold end of the working chamber 11 is lower than the external temperature Tam, as the air volume toward the heat absorption portion 62 (which is an external heat exchanger that functions as the low temperature heat exchanger 4 in this case) increases, the amount of heat exchanged at the external heat exchanger increases. If the vehicle is traveling such that wind is blowing past the heat absorption portion 62, the external fan 63 is controlled while taking into consideration the air volume of this wind. In other words, if a sufficient air volume can be provided by traveling, the external fan 63 does not need to be operated. In addition, at step 113, the second air mix door 27 is controlled to fully open the path to the heating heat exchanger 25. Then, the blower flag is set to 0.

Figure 11:
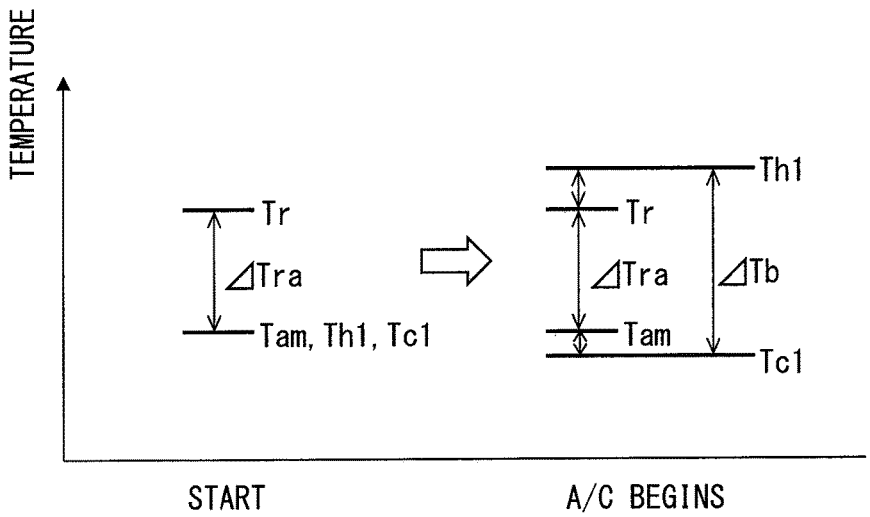
FIG. 11 is a graph for explaining a temperature change in each medium when a startup operation is performed in a magnetic heat pump device.
Figure 12:
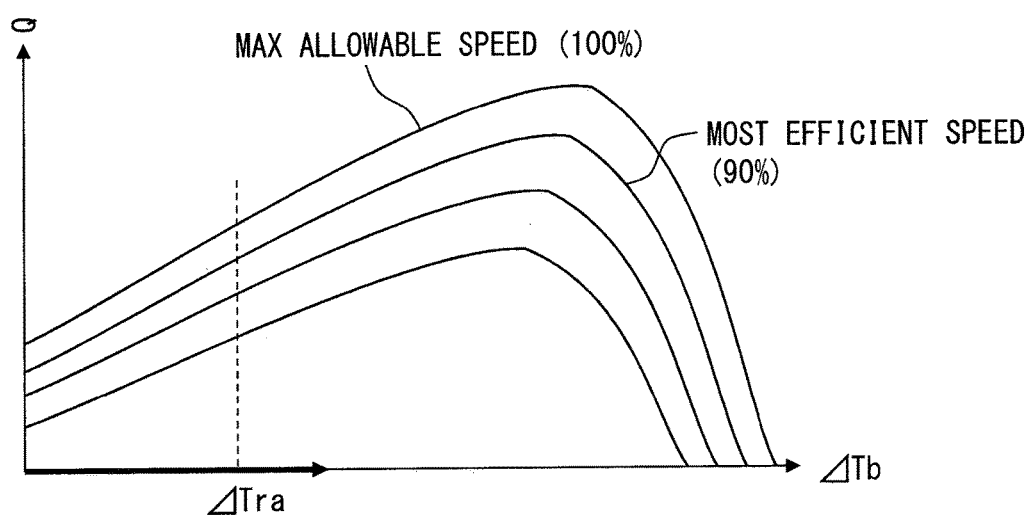
FIG. 12 shows an example of a status change in a thermal device along characteristic curves of thermal output with respect to temperature difference.

After performing step 113, the operation returns to step 111. Immediately after starting the heating operation, steps 111, 112, 113 are repeatedly performed until the determination at step 112 is "YES". Here, steps 111, 112, 113 correspond to a startup operation control. During this startup operation control, the hot end temperature of the working chamber 11 is assisted to increase, and the startup speed of the heat pump is increased. When the heating operation starts, as shown on the left side of FIG. 11, there is a temperature difference between the internal temperature Tr and the external temperature Tam, and since the MHP device 2 is in the outside air environment, the temperature Th1 of the hot end of the working chamber 11 and the temperature Tc1 of the cold end of the working chamber 11 are approximately equal to the external temperature Tam. From this state, by driving the motor 5 and ventilating air to the heat absorption portion 62 (i.e., the external heat exchanger) without ventilating air to the heating heat exchanger (i.e., the internal heat exchanger), the temperature relationship shown on the right side of FIG. 11 may be reached. By preventing heat exchange at the internal heat exchanger and performing heat exchange at the external heat exchanger, the hot end temperature Th1 may be reliably increased to reach and exceed the internal temperature Tr. Accordingly, when the internal blower 23 is driven and ventilates air, it is possible to heat the ventilation air flowing toward the vehicle cabin.

Step 113 corresponds to a startup operation unit that activates the magnetic field modulator 14 and the heat transport device 16 and performs the startup operation until reaching a steady operation, i.e., normal heating operation. Step 113 circulates outside air, i.e., external secondary fluid, in the external heat exchanger, and stops the circulation of ventilation air for the vehicle cabin, i.e., internal secondary fluid, to the internal heat exchanger. At step 113, the flow rate of the internal secondary fluid is not necessarily zero, and may be controlled to be smaller than the flow rate of the internal secondary fluid during steady operation.

At step 112, it is determined whether the temperature Th1 is higher than the internal temperature Tr and the temperature Tc1 is lower than the external temperature Tam. However, step 112 is not limited to this determination. If the startup operation at step 113 is continued, then typically, the temperature relationships shown on the right side of FIG. 11 will be reached, which allows steady operation to begin. Accordingly, as an alternative example, a determination of "YES" at step 112 may be reached when the temperature difference $\Delta Tb$ between the hot and cold ends exceeds a temperature difference $\Delta Tra$ between the internal and external air, which causes the operation to shift from startup operation to steady operation. Further alternatively, step 112 may simply determine whether the temperature Th1 is higher than the internal temperature Tr.

If a determination of "YES" is made at step 112, the operation continues to step 114. A determination of "YES" at step 112 means that the temperature difference $\Delta Tb$ between the hot end and the cold end of the working chamber 11 has increased past the temperature $\Delta Tra$ between the internal temperature and the external temperature, as shown by the thick lined arrow in FIG. 1. In other words, the temperature difference $\Delta Tb$ between the two ends of the working chamber 11 has entered a region where a relatively high thermal output Q may be obtained.

Step 112 corresponds to an operation transition unit that transitions from startup operation to steady operation when, while performing the startup operation at step 113 which is the startup operation unit, the temperature difference $\Delta Tb$ exceeds the temperature difference $\Delta Tra$ between the internal secondary fluid and the external secondary fluid.

At step 114, it is determined whether the blower flag is 0. If the blower flag is determined to be 0 at step 114, the air volume BL of the internal blower 23 is set to the target air volume BLO, and the operation continues to step 116. If the blower flag is determined to be 1 instead of 0 at step 114, then step 115 is skipped and the operation continues to step 116.

At step 116, various data readings are obtained. At step 116, the temperature Th1, Th2 of the heat transport medium are obtained from the temperature sensor 94, 95, and the target thermal output QO is obtained from the air conditioning controller 100. Further, a circulation amount of the heat transport medium is calculated and obtained from the rotation speed of the motor 5 and a discharge flow characteristic of the pump 17.

After performing step 116, the operation continues to step 117, and the actual thermal output Q is calculated. At step 117, the thermal output Q, which is the hot heat output at the heating heat exchanger 25, is calculated from a temperature difference between the temperatures Th1 and Th2, which represents the temperature of the heat transport medium before and after heat exchange change with ventilation air at the heating heat exchanger 25, respectively, and a flow rate of the heat transport medium passing through the heating heat exchanger 25.

After performing step 117, the operation continues to step 118, and the thermal output Q calculated at step 117 is compared with the target thermal output QO obtained at step 116. At step 118, if it is determined that the thermal output Q and the target thermal output QO are equal, the operation returns to step 111. At step 118, if it is determined that the thermal output Q is greater than the target thermal output QO, the operation proceeds to step 119.

At step 119, the blower flag is set to 0. Further, the external fan is controlled such that the external airflow rate FN toward the heat absorption portion 62 is at the reference level. In addition, the second air mix door 27 is controlled to a position that fully opens the path to the heating heat exchanger 25. After performing step 119, the process continues to step 120. At step 120, the rotation speed of the motor 5 is lower by one level, the levels being determined in advance. After performing step 120, the operation returns to step 111.

Figure 5:
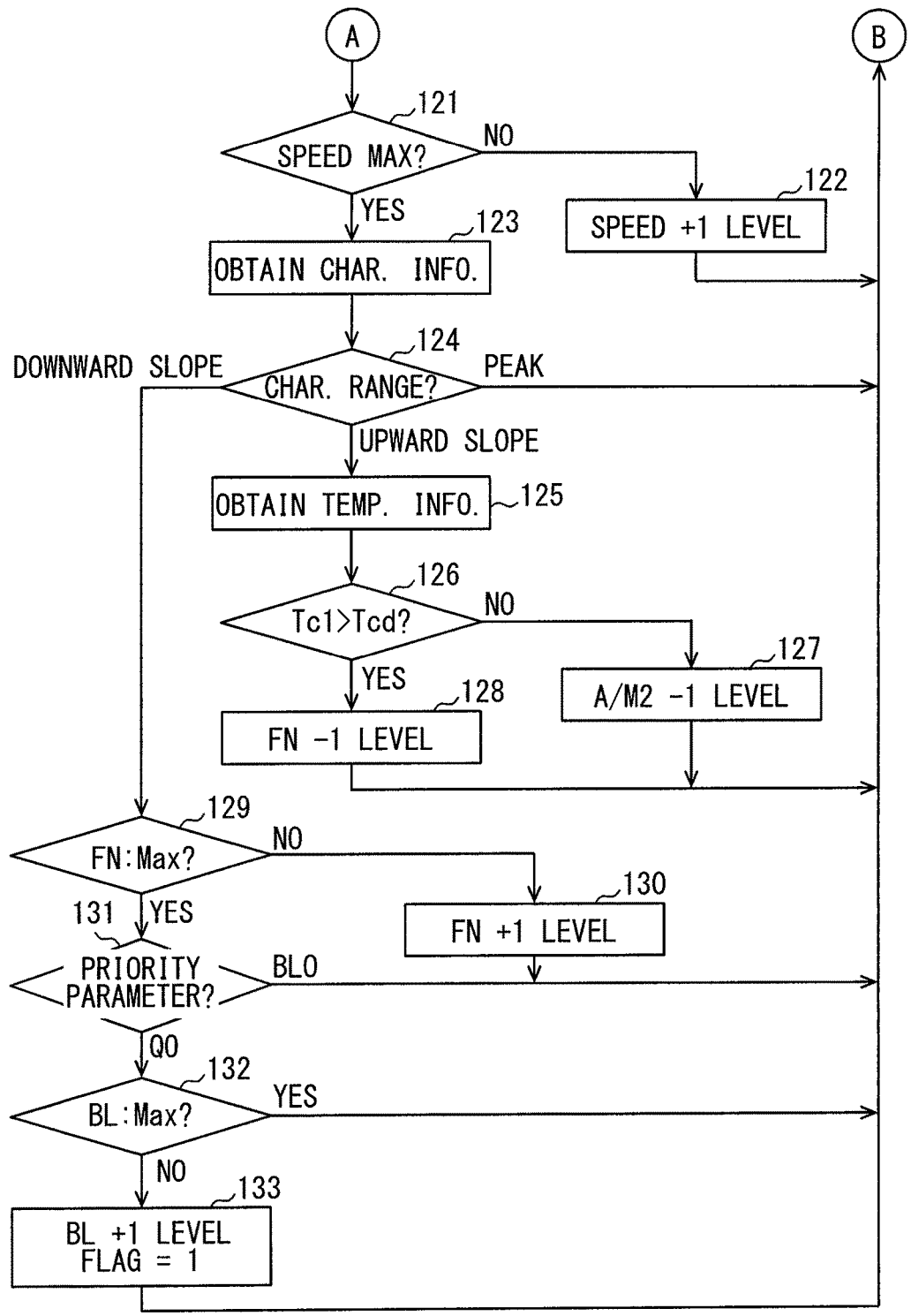
FIG. 5 is a flow chart showing a portion of a control operation of a magnetic heat pump device according to a first embodiment.

At step 118, if it is determined that the thermal output Q is lower than the target thermal output QO, the operation proceeds to step 121 shown in FIG. 5. At step 121, it is determined whether the rotation speed of the motor 5 is equal to the maximum allowed rotation speed. If it is determined at step 121 that the rotation speed of the motor 5 is not at the maximum allowed rotation speed, the operation continues to step 122, and the rotation speed of the motor 5 is increased by one predetermined level. After performing step 122, the operation returns to step 111.

Figure 13:
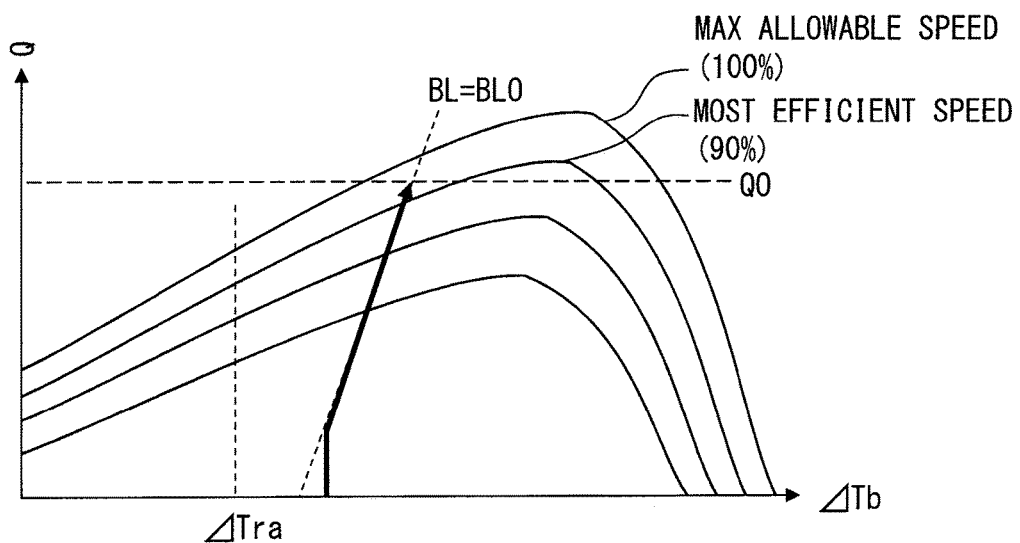
FIG. 13 shows an example of a status change in a thermal device along characteristic curves of thermal output with respect to temperature difference.

When "YES" is first determined at step 112 to transition from startup operation to steady operation, the air volume BL from the internal blower is set to the target air volume BLO and ventilation is performed, the thermal output Q is as s shown by the thick line arrow in FIG. 13. Then, after the determination at step 118, by adjusting the rotation speed of the motor 5 at steps 120 and 122, the thermal output Q is controlled to match the target thermal output QO along the characteristic line of the air volume BL matched with the target air volume BLO shown in FIG. 13

Figure 10:
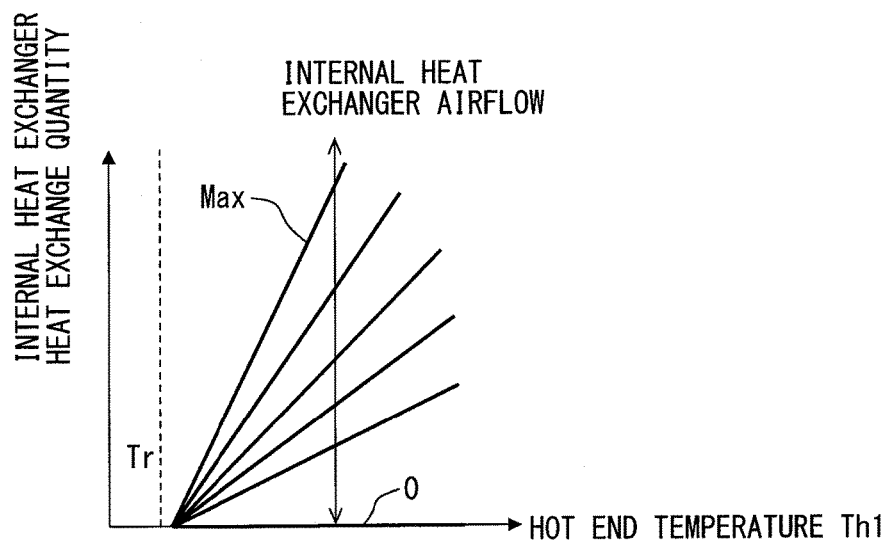
FIG. 10 is a graph showing a relationship between heat exchange amount at an internal heat exchanger and airflow rate to the internal heat exchanger.

As shown in FIG. 10, when the temperature of the heat transport medium at the hot end of the working chamber 11 is greater than the internal temperature Tr, the thermal output Q (i.e., the amount of heat exchanged at the internal heat exchanger) increases as the amount of air passing through the heating heat exchanger 25 increases. In this case, the heating heat exchanger 25 functions as the high temperature heat exchanger 3, which corresponds to the internal heat exchanger. In addition, assuming that the amount of air passing through the heating heat exchanger 25 remains equal, the thermal output Q increases as the difference between the internal temperature Tr and the temperature Th1 of the heat transport medium flowing into the heating heat exchanger 25 increases. As the temperature Th1 of the heat transport medium continues to increase over the internal temperature Tr, the temperature difference ΔTb increases with respect to the temperature ΔTra. Accordingly, when the air volume BL is unchanged so that a constant amount of air passes through the heating heat exchanger 25, the thermal output Q can be adjusted along the characteristic line of the air volume BL, which is shown as the slanted line in FIG. 13, according to the rotation speed of the motor 5.

If it is determined at step 121 that the rotation speed of the motor 5 is at the maximum allowed rotation speed, it may be difficult to increase thermal output Q by increasing the rotation speed of the motor 5, so the operation continues to step 123. At step 123, the characteristic information of the thermal output Q with respect to the temperature difference ΔTb is obtained. Step 123 corresponds to a characteristic information acquisition unit of the present embodiment. At step 123, a characteristic curve corresponding to when the motor 5 is at the maximum allowed rotation speed, or characteristic information related to the first characteristic region and the second characteristic region corresponding to the motor 5 at the maximum allowed rotation speed, is obtained from the characteristic information stored in the memory unit 102. After performing step 123, the operation continues to step 124.

At step 124, it is determined which of the characteristic regions of the characteristic information obtained at step 123 the current temperature difference ΔTb calculated from the temperatures Th1, Tc1 obtained at step 111 is in. Specifically, at step 124, it is determined whether the temperature difference ΔTb is in the first characteristic region where the characteristic curve has a downward slope, a second characteristic region where the characteristic curve has an upward slope, or a peak which is the maximum thermal output point of the characteristic curve. The first characteristic region is where thermal output Q decreases as temperature difference ΔTb increases, and the second characteristic region is where thermal output increases as temperature difference ΔTb increases.

At step 124, if the temperature difference ΔTb is determined to be at the peak of the characteristic curve, it may be difficult to further increase thermal output, thus the operation returns to step 111. At step 124, if the temperature difference ΔTb is determined to be in the second characteristic region where the characteristic curve is upwardly sloped, the operation continues to step 125, at which temperature information is obtained. At step 125, the temperature Tc1 detected by the temperature sensor 96 and the designed ideal cold end temperature Tcd when the motor 5 is at the maximum allowed rotation speed are obtained. The ideal cold end temperature Tcd may be referred to as a design cold end temperature. After performing step 125, the operation continues to step 126.

At step 126, it is determined whether the temperature Tc obtained at step 125 is higher than the ideal cold end temperature Tcd. If the temperature Tc1 is determined to be equal to or lower than the ideal cold end temperature Tcd at step 126, the operation continues to step 127. At step 127, the second air mix door 27 is moved to change the opening degree of the path to the heating heat exchanger 25 by one level. Specifically, the second air mix door 27 narrows the path to the heating heat exchanger 25 by one level, and opens the path to the second bypass passage 21B by one level. After performing step 127, the operation returns to step 111.

Figure 14:
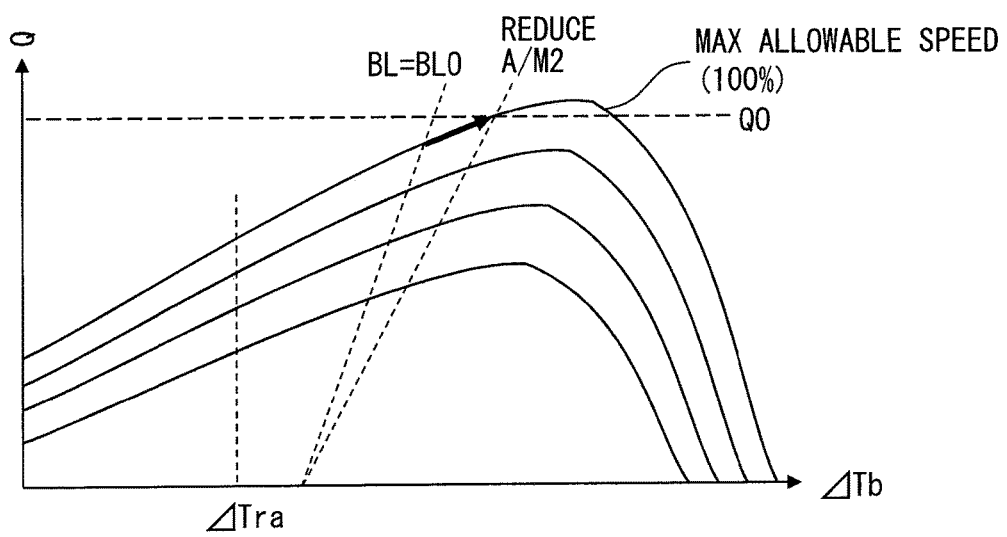
FIG. 14 shows an example of a status change in a thermal device along characteristic curves of thermal output with respect to temperature difference.

If the temperature Tc1 is determined to be equal to or lower than the ideal cold end temperature Tcd at step 126, the temperature of the heat transport medium at the cold end has reached the ideal temperature as designed. For this reason, thermal output Q is preferably raised by increasing the temperature of the heat transport medium at the hot end to increase the temperature difference ΔTb. In this regard, at step 127, the second air mix door 27 is used to narrow the path to the heating heat exchanger 25, thereby decreasing the amount of ventilation air (i.e., heating target fluid) passing through the heating heat exchanger 25. As a result, heat exchange is suppressed, and the temperature of the heat transport medium at the hot end is increased. The reduced portion of ventilation air passing through the heating heat exchanger 25 flows through the second bypass passage 21B and is mixed at the mixing space 21C with the heated air that passed through the heating heat exchanger 25. At this time, the air volume BL is maintained at the target air volume BLO, so the amount of air blown into the vehicle cabin is unchanged. When step 127 is performed, the thermal output Q rises as shown by the thick line arrow of FIG. 14.

If the temperature Tc1 is determined to be higher than the ideal cold end temperature Tcd at step 126, the operation continues to step 128. At step 128, the external fan 63 is controlled such that the external airflow rate FN toward the heat absorption portion 62 is decreased by one level. After performing step 128, the operation returns to step 111.

Figure 15:
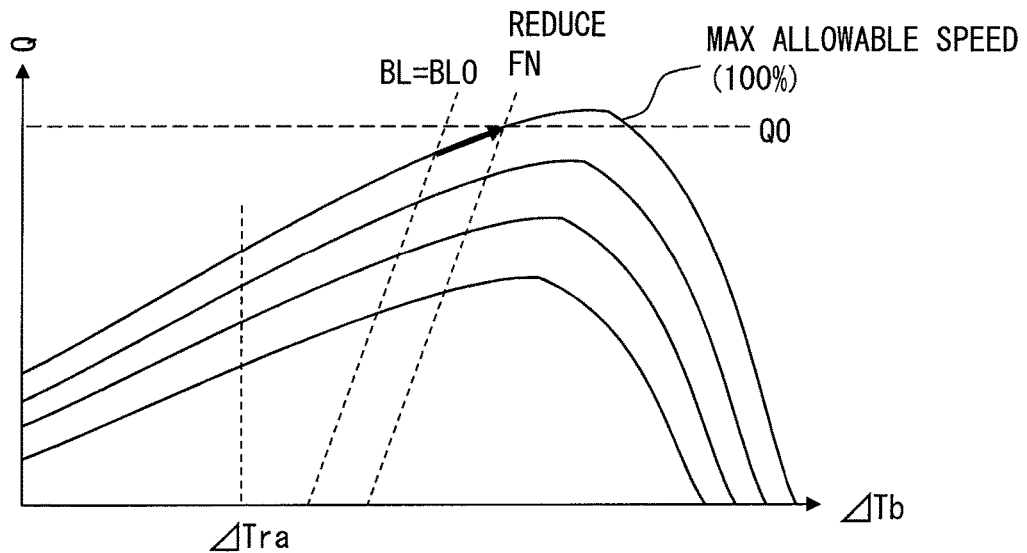
FIG. 15 shows an example of a status change in a thermal device along characteristic curves of thermal output with respect to temperature difference.

If the temperature Tc1 is determined to be higher than the ideal cold end temperature Tcd at step 126, the thermal output Q is preferably increased by lowering the temperature of the heat transport medium at the cold end to increase the temperature difference ΔTb. In this regard, at step 128, the external airflow rate FN toward the heat absorption portion 62 is increased, thereby suppressing heat exchange to lower the temperature of the heat transport medium at the cold end. When step 128 is performed, thermal output Q increases as shown by the thick line arrow in FIG. 15. Further, if the external fan 63 is already stopped so that the external airflow rate FN cannot be decreased at step 128, then the thermal output Q may be increased by performing step 127 instead.

At step 124, if the temperature difference ΔTb is determined to be in the first characteristic region where the characteristic curve has a downward slope, the operation proceeds to step 129. At step 129, it is determined whether the external fan 63 is operating at maximum capacity such that the external airflow rate FN to the heat absorption portion 62 is at a maximum value. If at step 129 it is determined that the external airflow rate FN is not at the maximum value, the operation continues to step 130. At step 130, the external fan 63 is controlled to increase the external airflow rate FN to the heat absorption portion 62 by one level. After performing step 130, the operation returns to step 111.

Figure 16:
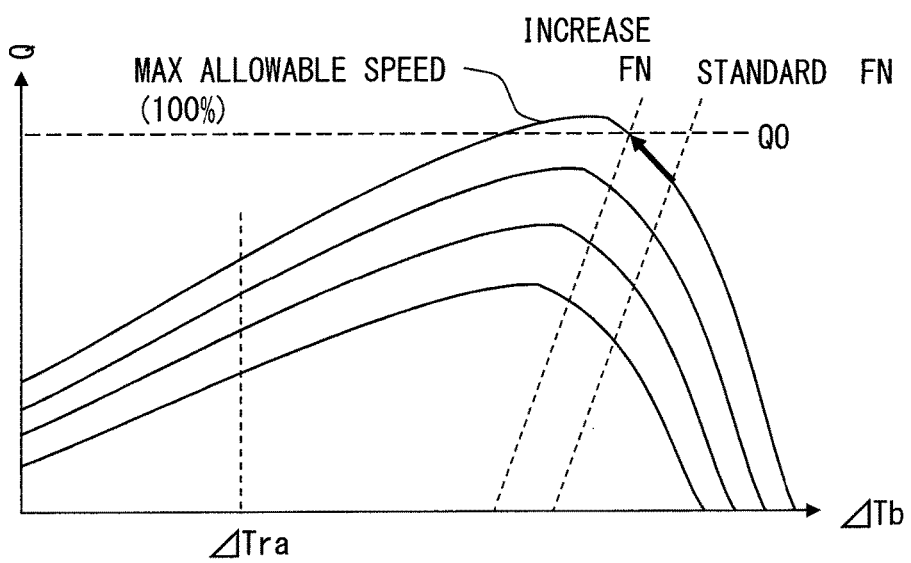
FIG. 16 shows an example of a status change in a thermal device along characteristic curves of thermal output with respect to temperature difference.

At step 129, when it is determined that the external airflow rate FN has not reached its maximum value, the external airflow rate FN to the heat absorption portion 62 may be increased to promote heat exchange, thereby increasing the temperature of the heat transport medium at the cold end. When step 130 is performed, the temperature of the heat transport medium at the cold end increases, thereby lowering the temperature difference ΔTb. As a result, the thermal output Q rises as shown by the thick line arrow in FIG. 16.

If at step 129 it is determined that the external airflow rate FN is at the maximum value, it may be difficult to increase the thermal output Q by increasing the external airflow rate FN. Thus, if at step 129 it is determined that the external airflow rate FN is at the maximum value, the operation continues to step 131. At step 131, it is determined whether the target air volume BLO or the target thermal output QO is the priority parameter input from the air conditioning controller 100.

At step 131, if it is determined that the target air volume BLO is the priority parameter, the operation returns to step 111. When the priority parameter is target air volume BLO, increasing the thermal output Q by setting the air volume BL higher than the target air volume BLO is not allowed. Accordingly, even if the thermal output Q has not reached the target thermal output Q, the operation returns to step 111.

At step 131, if it is determined that the target thermal output QO is the priority parameter, the operation continues to step 132. At step 132, it is determined whether the air volume is at its maximum value representing maximum capacity. If the air volume BL is determined to be at its maximum value at step 132, then the air volume BL cannot be increased, so even if the thermal output Q has not reached the target thermal output Q, the operation returns to step 111.

Figure 17:
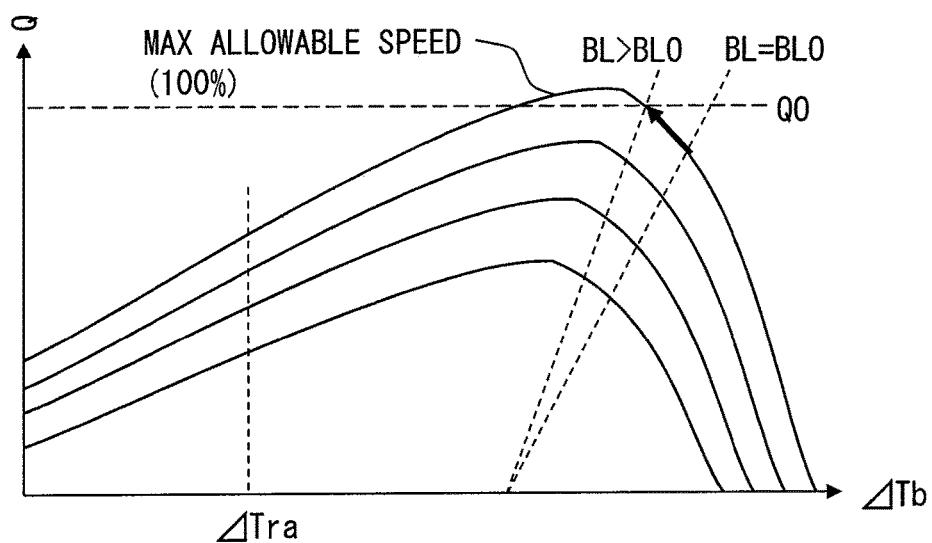
FIG. 17 shows an example of a status change in a thermal device along characteristic curves of thermal output with respect to temperature difference.

If the air volume BL is determined to be not at its maximum value at step 132, the operation continues to step 133. At step 133, the air volume BL from the internal blower 23 is increased by one predetermined level, and the blower flag is set to 1. At step 133, the priority parameter is the thermal output QO, so the air volume BL is increased even though the resulting air volume BL exceeds the target air volume BLO, and the amount of air passing through the heating heat exchanger 25 is increased. When the airflow through the heating heat exchanger 25 is increased, heat exchange is promoted and the temperature of the heat transport medium at the hot end decreases, thereby decreasing the temperature difference ΔTb. As a result, the thermal output Q rises as shown by the thick line arrow in FIG. 17. After performing step 133, the operation returns to step 111.

During the heating operation mode, the ventilator 23 and the second air mix door 27 provide a high temperature flow rate regulator that regulates the flow rate of the heating target fluid in the high temperature heat exchanger 3. Further, the external fan 63 provides a low temperature flow rate regulator that regulates the flow rate of the cooling target fluid in the low temperature heat exchanger 4. Steps 127, 128, 130, 133 correspond to a flow rate controller in the present embodiment. When steps 127, 128, 130, 133 are performed, at least one of the flow rate of the heating target fluid in the high temperature heat exchanger 3 and the flow rate of the cooling target fluid in the low temperature heat exchanger 4 is changed, such that the temperature difference ΔTb changes in a direction that increases thermal output Q.

Step 130 and step 133 correspond to a flow rate increasing unit that, when the temperature difference ΔTb is determined to be in the first characteristic region, increases at least one of the flow rate of the heating target fluid in the high temperature heat exchanger 3 and the flow rate of the cooling target fluid in the low temperature heat exchanger 4. Further, step 127 and step 128 correspond to a flow rate decreasing unit that, when the temperature difference ΔTb is determined to be in the second characteristic region, decreases at least one of the flow rate of the heating target fluid in the high temperature heat exchanger 3 and the flow rate of the cooling target fluid in the low temperature heat exchanger 4.

Next, an explanation will be provided for an operation in case the command values from the air conditioning controller 100 changes. When the above described control operation is performed to heat the vehicle cabin, typically the internal temperature Tr will increase, while the target air volume BLO and the target thermal output QO both decrease. In this case, first, the air volume BL is changed to match a new target air volume BLO. After that, it is determined that the thermal output Q is greater than a new target thermal output QO, and the rotation speed of the motor 5 is decreased. The rotation speed of the motor 5 is adjusted so that the thermal output Q matches the new target thermal output QO.

Figure 18:
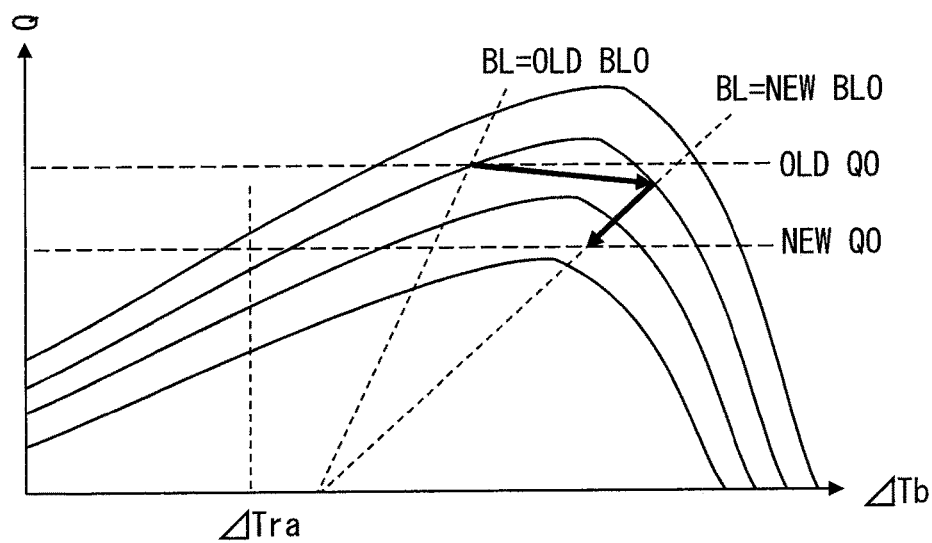
FIG. 18 shows an example of a status change in a thermal device along characteristic curves of thermal output with respect to temperature difference.

For example, as shown by the thick line arrows in FIG. 18, first, the air volume BL of the internal blower 23 is changed to match the new target air volume BLO. Thereafter, the thermal output Q is controlled to match the new target thermal output QO along the characteristic line of the air volume BL having matched with the new target air volume BLO.

Above, an explanation is provided for a control operation of the heat pump controller 101 when the vehicular air conditioning device 1 is set to the heating operation mode, but a control operation having the same technical ideas may be applied to operation modes other than the heating operation mode. For example, a control operation having the same technical ideas may be applied to the heating operation mode. That is, even when the cold heat output from the cold end of the working chamber 11 is used to cool the ventilation air passing through the cooling heat exchanger 24 (which functions as the low temperature heat exchanger 4 in this case), the above disclosed techniques may be applied.

In the cooling operation mode, the external fan 63 provides the high temperature flow rate regulator that regulates the flow rate of the heating target fluid in the high temperature heat exchanger 3. Further, the ventilator 23 and the first air mix door 26 provide the low temperature flow rate regulator that regulates the flow rate of the cooling target fluid in the low temperature heat exchanger 4. The first air mix door 26 is disposed in the ventilation passage in the air conditioning case 21, and during the cooling operation mode, provides an air delivery device that adjusts the air volume ratio between the amount of air passing through the low temperature heat exchanger 4 and the amount of air bypassing the low temperature heat exchanger 4. The vehicular air conditioning device 1 includes the first air mix door 26 as the air delivery device during the cooling operation mode.

The above described configurations and operations exhibit at least the following effects.

The MHP device 2 includes the high temperature heat exchanger 3, which uses the hot heat output from the hot end of the working chamber 11, which is a portion of the thermal output from the working chamber 11, to heat the heating target fluid by exchanging heat with the heat transport medium, and the high temperature flow rate regulator that regulates the flow rate of the heating target fluid in the high temperature heat exchanger 3. Further, the MHP device 2 includes the low temperature heat exchanger 4, which uses the cold heat output from the cold end of the working chamber 11, which is a portion of the thermal output from the working chamber 11, to cool the cooling target fluid by exchanging heat with the heat transport medium, and the low temperature flow rate regulator that regulates the flow rate of the cooling target fluid in the low temperature heat exchanger 4. In addition, the MHP device 2 includes the HPECU 101 as a controller that controls the operation of the magnetic field modulator 14, the heat transport device 16, the high temperature flow rate regulator and the low temperature flow rate regulator.

The HPECU 101 performs step 123 as a characteristic information acquisition unit that obtains the characteristic information of thermal output Q with respect to the temperature difference ΔTb between the hot end and the cold end of the working chamber 11. When increasing thermal output, the HPECU 101 controls the high temperature flow rate regulator and the low temperature flow rate regulator. Based on the characteristic information obtained by the characteristic information acquisition unit, the HPECU 101 changes at least one of the flow rate of the heating target fluid in the high temperature heat exchanger 3 and the flow rate of the cooling target fluid in the low temperature heat exchanger 4, such that the temperature difference ΔTb changes in a direction that increases thermal output. The HPECU 101 performs steps 127, 128, 130, 133 as a flow rate controller that changes at least one of the flow rate of the heating target fluid in the high temperature heat exchanger 3 and the flow rate of the cooling target fluid in the low temperature heat exchanger 4.

Accordingly, the MHP device 2 includes the high temperature flow rate regulator that regulates the flow rate of the heating target fluid in the high temperature heat exchanger 3, the low temperature flow rate regulator that regulates the flow rate of the cooling target fluid in the low temperature heat exchanger 4, and the HPECU 101 that controls these devices. The HPECU 101 includes the characteristic information acquisition unit that obtains the characteristic information of thermal output Q with respect to the temperature difference ΔTb between the hot end and the cold end of the working chamber 11, and the flow rate controller that, based on the characteristic information obtained by the characteristic information acquisition unit, controls the high temperature flow rate regulator and the low temperature flow rate regulator.

When increasing the thermal output Q from the working chamber 11, the flow rate controller controls the high temperature flow rate regulator and the low temperature flow rate regulator based on the characteristic information such that the temperature difference ΔTb changes in a direction that increases thermal output Q. The flow rate controller changes at least one of the flow rate of the heating target fluid in the high temperature heat exchanger 3 and the flow rate of the cooling target fluid in the low temperature heat exchanger 4, such that the temperature difference ΔTb changes in a direction that increases thermal output. Accordingly, when the thermal output Q from the working chamber 11 does not meet the target thermal output Q, by appropriately adjusting at least one of the flow rate of the heating target fluid and the flow rate of the cooling target fluid based on the characteristic information to change the temperature difference ΔTb, the thermal output Q from the working chamber 11 may be increased. In this regard, the thermal output Q from the working chamber 11 may be increased by appropriate flow rate control of the heating target fluid or the cooling target fluid.

In addition, when increasing the thermal output Q, the flow rate controller performs the following control process based on the characteristic information obtained by the characteristic information acquisition unit. If it is determined that the temperature difference ΔTb is in the first characteristic region where thermal output Q decreases as the temperature difference ΔTb increases, the flow rate controller increases at least one of the flow rate of the heating target fluid in the high temperature heat exchanger 3 and the flow rate of the cooling target fluid in the low temperature heat exchanger 4. The flow rate increasing unit which increases the flow rate of the secondary fluids corresponds to performing steps 130, 133. Further, if it is determined that the temperature difference ΔTb is in the second characteristic region where thermal output Q increases as the temperature difference ΔTb increases, the flow rate controller decreases at least one of the flow rate of the heating target fluid in the high temperature heat exchanger 3 and the flow rate of the cooling target fluid in the low temperature heat exchanger 4. The flow rate decreasing unit which decreases the flow rate of the secondary fluids corresponds to performing steps 127, 128.

Due to the above, both flow rate regulators may be controlled according to whether the temperature difference ΔTb is in the first characteristic region where thermal output Q decreases as the temperature difference ΔTb increases or the second characteristic region where thermal output Q increases as the temperature difference ΔTb increases in the characteristic information. When the temperature difference ΔTb is in the first characteristic region, the flow rate increasing unit increases at least one of the flow rate of the heating target fluid and the flow rate of the cooling target fluid to decrease the temperature difference ΔTb. Further, when the temperature difference ΔTb is in the second characteristic region, the flow rate decreasing unit decreases at least one of the flow rate of the heating target fluid and the flow rate of the cooling target fluid to increase the temperature difference ΔTb. Accordingly, by regulating at least one of the flow rate of the heating target fluid and the flow rate of the cooling target fluid according to the region the temperature difference ΔTb is in to change the temperature difference ΔTb, the thermal output Q from the working chamber 11 may be increased.

Further, the HPECU 101 includes the memory unit 102 for storing the characteristic information. In addition, the characteristic information acquisition unit that obtains the pre-stored characteristic information from the memory unit 102. Accordingly, the HPECU 101 is able to easily obtain the pre-stored characteristic information from the memory unit 102 with the characteristic information acquisition unit, and then control the operations of the high temperature flow rate regulator and the low temperature flow rate regulator.

Further, the first air mix door 26 is disposed in the ventilation passage in the air conditioning case 21, and during the cooling operation mode, provides an air delivery device that adjusts the air volume ratio between air passing through the low temperature heat exchanger 4 and the amount of air bypassing the low temperature heat exchanger 4. The vehicular air conditioning device 1 includes the first air mix door 26 as the air delivery device during the cooling operation mode.

Accordingly, In an air conditioning device that cools air flowing through the ventilation passage arranged in the low temperature heat exchanger 4 in the air conditioning case 21 and blown into the cabin, the air delivery device, which adjusts the ratio of air passing through the low temperature heat exchanger 4 and the amount of air bypassing the low temperature heat exchanger 4, may act as the low temperature flow rate regulator. Accordingly, the air delivery device may easily adjust the flow rate of the cooling target fluid in the low temperature heat exchanger 4.

In addition, the MHP device 2 includes the temperature sensors 94, 95 as a pair of high temperature sensors that detect the temperature of the heat transport medium both before and after heat exchange with the heating target fluid at the high temperature heat exchanger 3. Further, the MHP device 2 includes the temperature sensors 96, 97 as a pair of low temperature sensors that detect the temperature of the heat transport medium both before and after heat exchange with the cooling target fluid at the low temperature heat exchanger 4.

Accordingly, the pair of high temperature sensors can easily detect a temperature difference of the heat transport medium before and after heat exchange with the heating target fluid at the high temperature heat exchanger 3. Further, one high temperature sensor of the pair of high temperature sensors is able to easily detect the temperature of the heat transport medium before heat exchange at the high temperature heat exchanger 3 as the hot end temperature of the working chamber 11. Additionally, the pair of low temperature sensors may easily detect a temperature difference of the heat transport medium before and after heat exchange with the cooling target fluid at the low temperature heat exchanger 4. In addition, one low temperature sensor of the pair of low temperature sensors may easily detect the temperature of the heat transport medium before heat exchange at the low temperature heat exchanger 4 as the cold end temperature of the working chamber 11. Accordingly, it is possible to reliably obtain the temperature information needed to calculate the thermal outputs of heat exchangers of temperature differences of the working chamber 11.

During the heating operation mode or the cooling operation mode, one of the high temperature heat exchanger 3 and the low temperature heat exchanger 4 acts as the internal heat exchanger disposed within the cabin, and the heating target fluid or the cooling target fluid flowing through the internal heat exchanger acts as the internal secondary fluid. The other of the high temperature heat exchanger 3 and the low temperature heat exchanger 4 acts as the external heat exchanger disposed outside the cabin, and the heating target fluid or the cooling target fluid flowing through the external heat exchanger acts as the external secondary fluid.

The HPECU 101 includes the startup operation unit that that activates the magnetic field modulator 14 and the heat transport device 16 and performs the startup operation until reaching steady operation. During the heating operation mode, step 113 is the startup operation unit. The startup operation unit circulates the external secondary fluid and controls the flow rate of the internal secondary fluid such that the circulation of the internal secondary fluid is stopped or the flow rate of the internal secondary fluid is lower than during steady operation.

Accordingly, when activating the magnetic field modulator 14 and the heat transport device 16 and performing the startup operation until reaching steady operation, the external secondary fluid is circulated, and the flow rate of the internal secondary fluid is controlled such that the circulation of the internal secondary fluid is stopped or the flow rate of the internal secondary fluid is lower than during steady operation. As a result, it is possible to change the temperature of the end of the working chamber 11 connected to the internal heat exchanger so that the temperature difference between the two ends of the working chamber 11 quickly widens. Due to this, it is possible to reduce the time needed to reach steady operation after activating the magnetic field modulator 14 and the heat transport device 16.

Further, the HPECU 101 includes the operation transition unit that transitions from startup operation to steady operation when, while the startup operation unit is performing the startup operation, the temperature difference $\Delta Tb$ between the hot end and the cold end of the working chamber 11 exceeds the temperature difference $\Delta Tra$ between the internal secondary fluid and the external secondary fluid. The transition from startup operation to steady operation is performed at step 112, which corresponds to the operation transition unit. Accordingly, after performing the startup operation and it becomes possible to perform heat exchange between the heat transport medium and the secondary fluids at both the internal heat exchanger and the external heat exchanger, the operation transition unit is able to transition to steady position.

Second Embodiment

Next, a second embodiment will be explained with reference to FIGS. 19 to 21.

In comparison to the first embodiment, the second embodiment differs in the method of obtaining the characteristic information of the thermal output Q with respect to the temperature difference $\Delta Tb$ between the hot end and the cold end of the working chamber 11. Further, portions which are the same as the first embodiment are denoted with the same reference numerals, and explanations thereof are omitted for brevity. The components denoted with the same reference numerals as the figures of the first embodiment, and other components not explained in the second embodiment, are the same as those of the first embodiment and exhibit the same operational effects.

Figure 19:
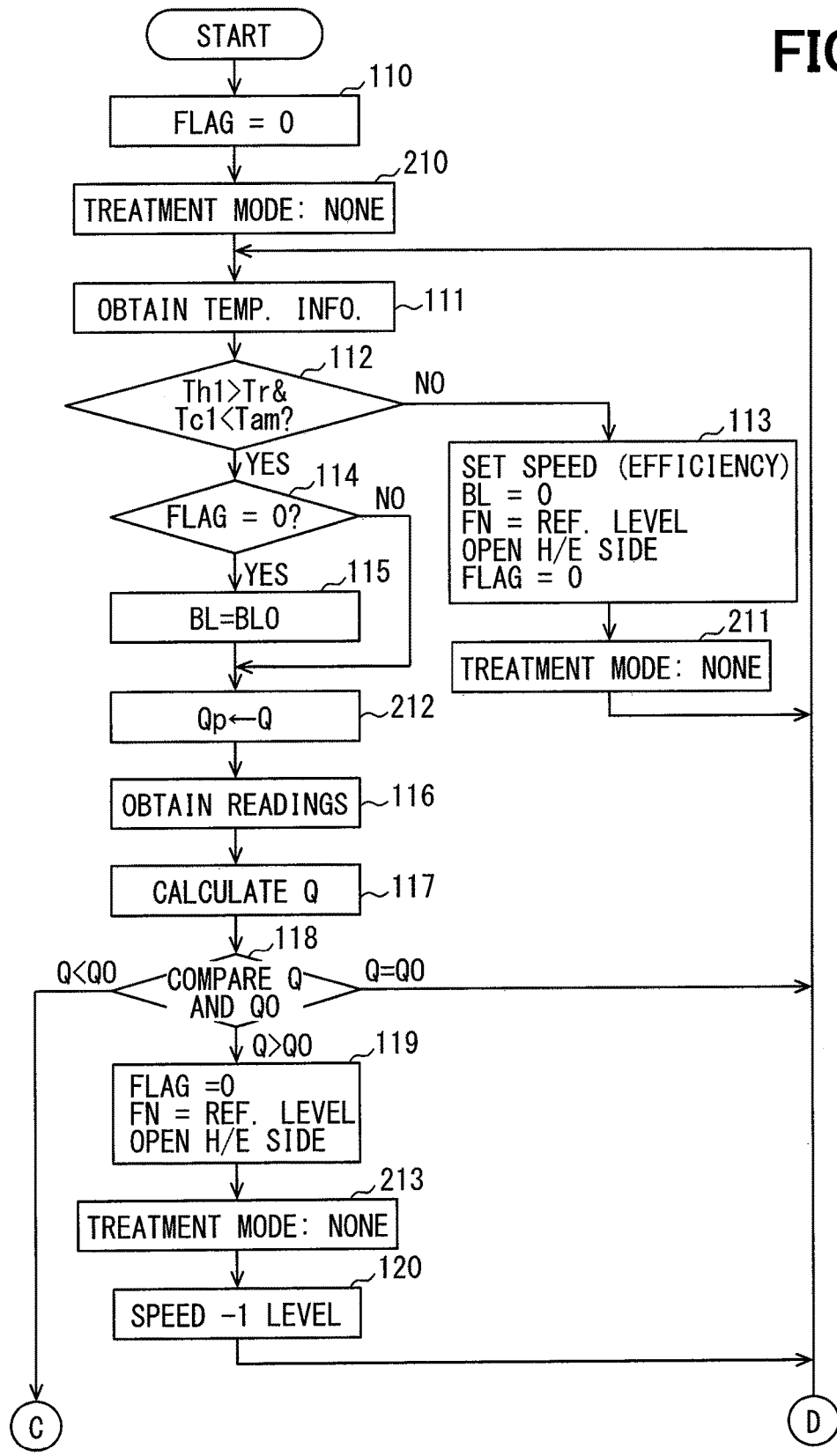
FIG. 19 is a flow chart showing a portion of a control operation of a magnetic heat pump device according to a second embodiment.

As shown in FIG. 19, the HPECU 101 of the present embodiment proceeds to step 210 after performing step 110. At step 210, a treatment mode is set to "none". Here, the treatment mode refers to a thermal output increasing treatment mode that increases the thermal output Q by changing at least one of the flow rate of the heating target fluid in the high temperature heat exchanger 3 and the flow rate of the cooling target fluid in the low temperature heat exchanger 4. After performing step 210, the operation continues to step 111.

Further, according to the HPECU 101 of the present embodiment, after performing step 113, step 211 is performed, and then the operation returns to step 111. At step 211, the treatment mode is set to "none".

Further, after performing step 115, or if it is determined at step 114 to skip step 115, step 212 is performed, and the operation continues to step 116. At step 212, the thermal output Q calculated at the most recent performance of step 117 is recorded as a previous thermal output Qp. Specifically, the thermal output Q calculated at the previous step 117 is stored as the previous thermal output Qp in preparation for the new thermal output Q calculated at steps 116, 117 immediately after step 212.

Further, after performing step 119, step 213 is performed, and the operation continues to step 120. At step 213, the treatment mode is set to "none".

Further, at step 121, when it is determined that the rotation speed of the motor 5 is at the maximum allowed rotation speed, the operation continues to step 214. At step 214, a characteristic information detection operation is performed to detect the characteristic information of the thermal output Q with respect to the temperature difference ΔTb. The control operation of step 214 will be explained later. After performing step 214, the operation continues to step 124.

At step 124, if the temperature difference ΔTb is determined to be at the peak of the characteristic curve, step 215 is performed, and then the operation returns to step 111. At step 215, the treatment mode is set to "none".

After performing step 127 or 128, step 216 is performed, and then the operation returns to step 111. At step 216, the treatment mode is set to "reduce flow". At step 127, the amount of ventilation air, which is the heating target fluid, passing through the heating heat exchanger 25 is reduced. At step 128, the airflow rate FN of external air, which is the cooling target fluid, passing through the heat absorption portion 62 is reduced. In other words, when step 127 or step 128 is performed, the flow fate of the secondary fluid of either the high temperature heat exchanger 3 or the low temperature heat exchanger 4 is reduced to increased thermal output Q. In this regard, the treatment mode is set to "reduce flow" at step 216.

After performing step 130, step 217 is performed, and then the operation returns to step 111. At step 217, the treatment mode is set to "increase flow". At step 130, the airflow rate FN of external air, which is the cooling target fluid, passing through the heat absorption portion 62 is increased. In other words, when step 130 is performed, the flow fate of the secondary fluid of the low temperature heat exchanger 4 is increased to increased thermal output Q. In this regard, the treatment mode is set to "increase flow" at step 217.

If the priority parameter is determined to be target air volume BLO at step 131, or if the air volume BL is determined to be at its maximum value at step 132, then step 218 is performed, and then the operation returns to step 111. At step 218, the treatment mode is set to "none".

After performing step 133, step 219 is performed, and then the operation returns to step 111. At step 219, the treatment mode is set to "increase flow". At step 133, the air volume BL from the internal blower 23 is increased. In other words, when step 133 is performed, the flow fate of the secondary fluid of the high temperature heat exchanger 3 is increased to increased thermal output Q. In this regard, the treatment mode is set to "increase flow" at step 219.

Next, the characteristic information detection operation performed at step 214 will be explained with reference to FIG. 21. As shown in FIG. 21, first at step 230, it is determined whether the treatment mode is set to "none", "reduce flow", or "increase flow".

If the treatment is determined to be set to "none" at step 230, there are no changes in the flow rate of the secondary fluid, and the operation continues to step 124. If the treatment is determined to be set to "reduce flow" at step 230, the operation continues to step 231. At step 231, the thermal output Q calculated at step 117 is compared with the previous thermal output Qp obtained at step 212.

At step 231, if the thermal output Q is determined to be smaller than the previous thermal output Q, the operation continues to step 232. At step 231, if the thermal output Q is determined to be smaller than the previous thermal output Q, then reducing the flow rate of the secondary fluid, which reduces the heat exchange amount and increases the temperature difference ΔTb, has resulted in a decrease in thermal output. In other words, this means the temperature difference ΔTb is in the first characteristic region where thermal output decreases as the temperature difference ΔTb increases. In this regard, at step 232, the characteristic region is set as the "downward slope region" of the characteristic curve, i.e., the first characteristic region.

At step 231, if the thermal output Q is determined to be equal to the previous thermal output Q, the operation continues to step 233. At step 231, if the thermal output Q is determined to be equal to the previous thermal output Q, then reducing the flow rate of the secondary fluid, which reduces the heat exchange amount and increases the temperature difference ΔTb, has resulted in no change in thermal output. In other words, this means the temperature difference ΔTb is at the peak between the first characteristic region where thermal output decreases as the temperature difference ΔTb increases and the second characteristic region where thermal output increases as the temperature difference ΔTb increases. In this regard, at step 233, the characteristic region is set as the "peak" of the characteristic curve.

At step 231, if the thermal output Q is determined to be greater than the previous thermal output Q, the operation continues to step 234. At step 231, if the thermal output Q is determined to be greater than the previous thermal output Q, then reducing the flow rate of the secondary fluid, which reduces the heat exchange amount and increases the temperature difference ΔTb, has resulted in an increase in thermal output. In other words, this means the temperature difference ΔTb is in the second characteristic region where thermal output increases as the temperature difference ΔTb increases. In this regard, at step 234, the characteristic region is set as the "upward slope region" of the characteristic curve, i.e., second first characteristic region. After performing any of steps 232, 233, 234, the operation continues to step 124.

If the treatment is determined to be set to "increase flow" at step 230, the operation continues to step 235. At step 235, the thermal output Q calculated at step 117 is compared with the previous thermal output Qp obtained at step 212.

At step 235, if the thermal output Q is determined to be smaller than the previous thermal output Q, the operation continues to step 236. At step 235, if the thermal output Q is determined to be smaller than the previous thermal output Q, then increasing the flow rate of the secondary fluid, which increases the heat exchange amount and reduces the temperature difference ΔTb, has resulted in a decrease in thermal output. In other words, this means the temperature difference ΔTb is in the second characteristic region where thermal output increases as the temperature difference ΔTb increases. In this regard, at step 236, the characteristic region is set as the "upward slope region" of the characteristic curve, i.e., the second characteristic region.

At step 235, if the thermal output Q is determined to be equal to the previous thermal output Q, the operation continues to step 237. At step 235, if the thermal output Q is determined to be equal to the previous thermal output Q, then increasing the flow rate of the secondary fluid, which increases the heat exchange amount and decreases the temperature difference ΔTb, has resulted in no change in thermal output. In other words, this means the temperature difference ΔTb is at the peak between the first characteristic region where thermal output decreases as the temperature difference ΔTb increases and the second characteristic region where thermal output increases as the temperature difference ΔTb increases. In this regard, at step 237, the characteristic region is set as the "peak" of the characteristic curve.

At step 235, if the thermal output Q is determined to be greater than the previous thermal output Q, the operation continues to step 238. At step 235, if the thermal output Q is determined to be greater than the previous thermal output Q, then increasing the flow rate of the secondary fluid, which increases the heat exchange amount and reduces the temperature difference ΔTb, has resulted in an increase in thermal output. In other words, this means the temperature difference ΔTb is in the first characteristic region where thermal output decreases as the temperature difference ΔTb increases. In this regard, at step 238, the characteristic region is set as the "downward slope region" of the characteristic curve, i.e., the first characteristic region. After performing any of steps 236, 237, 238, the operation continues to step 124.

Figure 20:
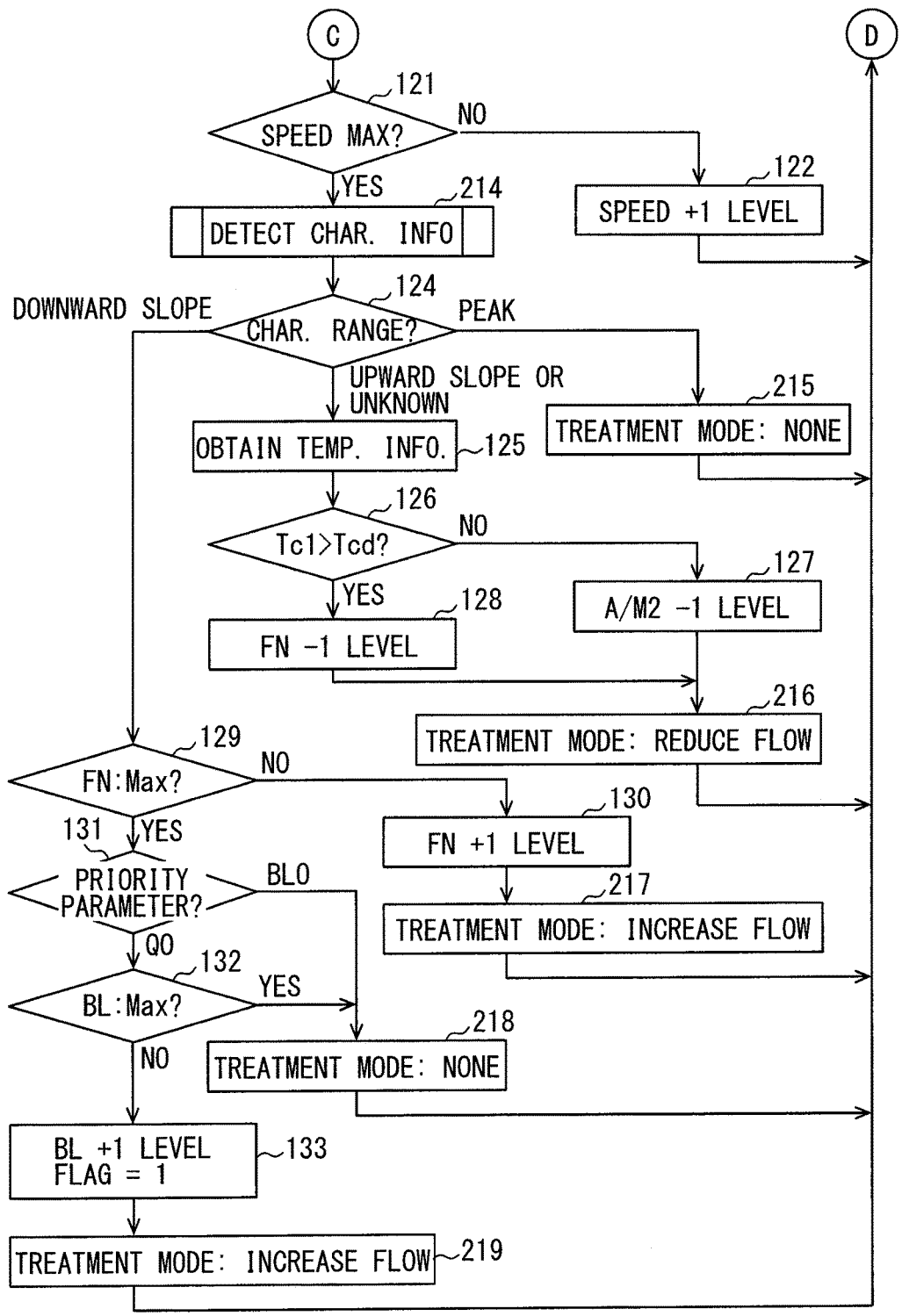
FIG. 20 is a flow chart showing a portion of a control operation of a magnetic heat pump device according to a second embodiment.
Figure 21:
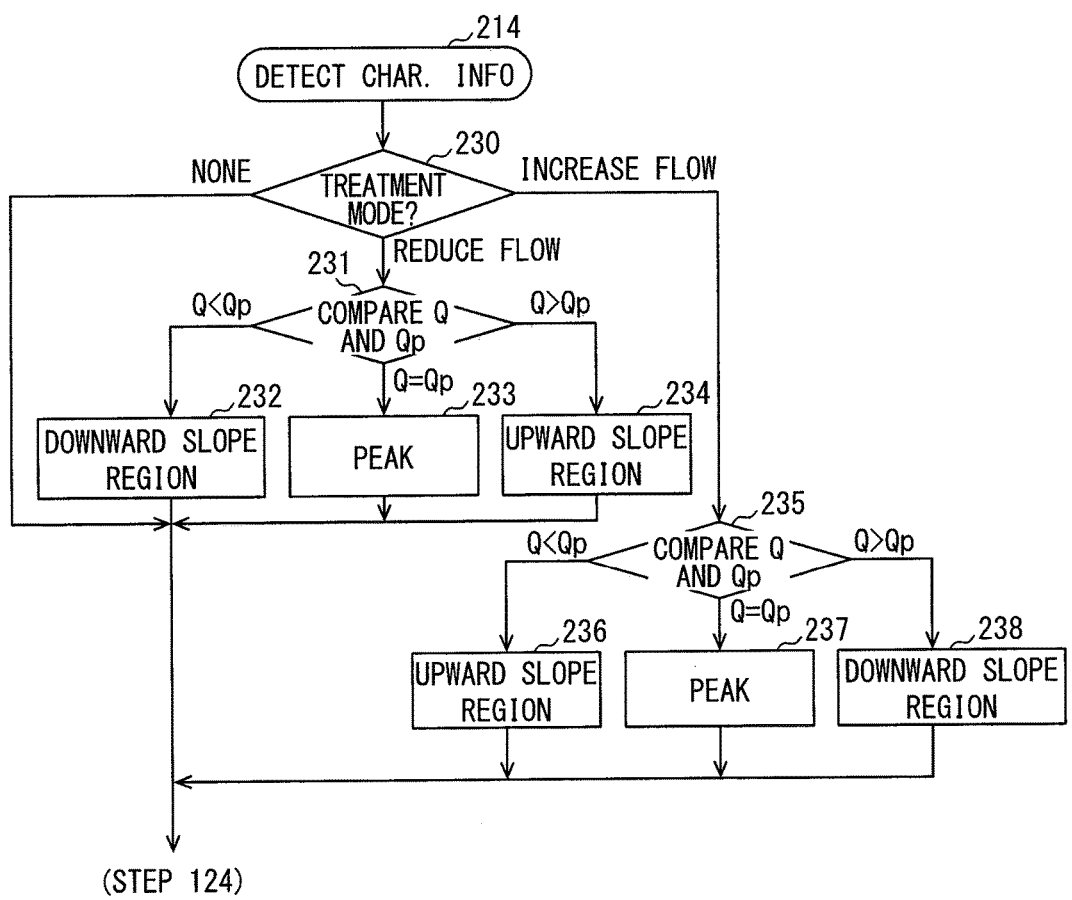
FIG. 21 is a flow chart showing a portion of a control operation of a magnetic heat pump device according to a second embodiment.

At step 124 shown in FIG. 20, it is determined which characteristic region the current temperature difference ΔTb is in based on the characteristic information detected at step 214. At step 124, it is determined which of "downward slope", "peak", and "upward slope" was set at step 214. In other words, at step 124, it is determined whether the temperature difference ΔTb is in the first characteristic region where the characteristic curve has a "downward slope", the second characteristic region where the characteristic curve has an "upward slope", or the "peak" which is the maximum thermal output point of the characteristic curve. In the first characteristic region, thermal output Q decreases as the temperature difference ΔTb increases. In second first characteristic region, thermal output Q increases as the temperature difference ΔTb increases. Further, at step 124, if the characteristic region is unknown due to the treatment mode being set to "none", then the operation continues to step 125.

In the present embodiment, step 214 is a characteristic detection unit that detects the characteristic information, and also corresponds to the characteristic information acquisition unit that obtains the characteristic information.

According to the present embodiment, at least the same effects as the first embodiment may be obtained.

Further, the HPECU 101 of the present embodiment includes step 214 as the characteristic detection unit which detects the characteristic information based on the change in thermal output when at least one of the flow rate of the heating target fluid in the high temperature heat exchanger 3 and the flow rate of the cooling target fluid in the low temperature heat exchanger 4 is changed. Step 214, which also corresponds to the characteristic information acquisition unit, obtains the characteristic information detected by the characteristic detection unit.

Accordingly, the HPECU 101 may control the operation of the high temperature flow rate regulator and the low temperature flow rate regulator by obtaining the characteristic information detected by the characteristic detection unit with the characteristic information acquisition unit. Further, it is not necessary to store any characteristic information in advance.

Further, the HPECU 101 of the present embodiment detects the characteristic information by repeating a control cycle for obtaining the desired thermal output. Accordingly, it is not necessary to adjust the secondary fluids passing through the heat exchangers just for detecting the characteristic information.

Further, according to the present embodiment, the control operation of the HPECU 101 is explained for when the vehicular air conditioning device 1 is set to the heating operation mode. However, a control operation with the same technical ideas may be applied to operation modes other than the heating operation mode. For example, a control operation having the same technical ideas may be applied to the cooling operation mode. That is, even when the cold heat output from the cold end of the working chamber 11 is used to cool the ventilation air passing through the cooling heat exchanger 24 (which functions as the low temperature heat exchanger 4 in this case), the above disclosed techniques may be applied.

Other Embodiments

The techniques disclosed herein are not limited the above embodiments which illustrate exemplary embodiments for implementing these disclosed techniques, and a variety of modifications are contemplated. The disclosed techniques are not limited to combinations disclosed in the embodiments, and may be combined in a variety of manners. The embodiments may include additional components. Parts of the embodiments may have been omitted for brevity. Parts of each embodiment may be switched or combined with those of other embodiments. The configuration, operation, and effect of each embodiment are only examples, and the technical scope thereof are not limited to the described embodiments.

Figure 22:
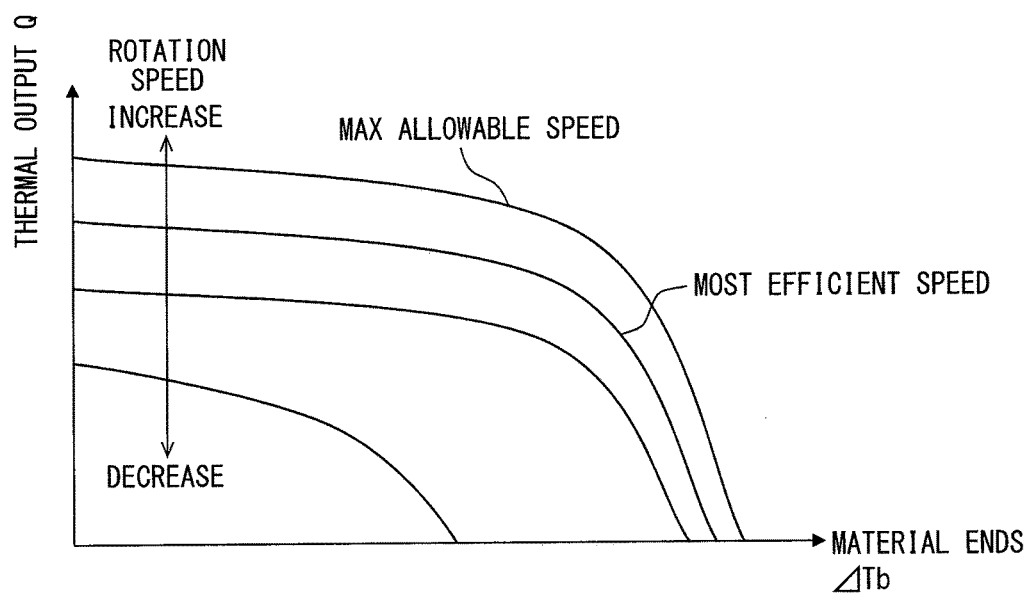
FIG. 22 is a graph showing another exemplary characteristic information of thermal output with respect to temperature difference.

In the above described embodiments, the characteristic of the thermal output Q with respect to the temperature difference ΔTb is shown as having the first characteristic region where thermal output Q decreases as the temperature difference ΔTb increases and the second characteristic region where thermal output Q increases as the temperature difference ΔTb increases, but this is not limiting. For example, as shown in FIG. 22, the characteristic of the thermal output Q with respect to the temperature difference ΔTb may only have the first characteristic region where thermal output Q decreases as the temperature difference ΔTb increases. In this case, the techniques disclosed herein may be applied as well.

Further, in the above described embodiments, if the thermal output Q is below the target thermal output QO even if the rotation speed of the motor 5 is at the maximum allowed rotation speed, the thermal output Q is increased by changing at least one of the flow rate of the heating target fluid in the high temperature heat exchanger 3 and the flow rate of the cooling target fluid in the low temperature heat exchanger 4. However, this is not limiting. Both the flow rate of the heating target fluid in the high temperature heat exchanger 3 and the flow rate of the cooling target fluid in the low temperature heat exchanger 4 may be changed such that the temperature difference ΔTb changes in a direction that increases thermal output Q.

Further, in the above described embodiments, when calculating the actual thermal output Q at step 117, the temperature difference of the heat transport medium before and after heat exchange is used. For this reason, the MHP device 2 includes the pair of high temperature sensors 94, 95 and the pair of low temperature sensors 96, 97. However, this is not limiting. For example, the temperature sensor 94 that detects the hot end temperature Th1 may be provided with the temperature sensor 95 being omitted, and a heat exchanger characteristic of the high temperature heat exchanger 3 may be used to calculate thermal output Q. Further, for example, the temperature sensor 94 that detects the cold end temperature Tc1 may be provided with the temperature sensor 97 being omitted, and a heat exchanger characteristic of the low temperature heat exchanger 4 may be used to calculate cold heat output.

Further, in the above described embodiments, in order to calculate the actual thermal output Q at step 117, the circulation amount of the heat transport medium is obtained from the rotation speed of the motor 5 and the discharge flow characteristic of the pump 17 at step 116. However, this is not limiting. For example, a flow meter that measures the flow rate of the heat transport medium may be provided, and the output of the flow meter may be used.

Further, in the above described embodiments, the magnetic field modulator 14 and the heat transport device 16 are commonly driven by the motive power source 5. In other words, the flow rate of the heat transport medium due to the pump 17 changes proportionally with changes in the operation frequency of the magnetic field modulator 14 and the flow path switching mechanism 18. However, this is not limiting. For example, the motive power source for driving the magnetic field modulator 14 and the flow path switching mechanism 18 is may disposed separately from the motive power source for driving the pump 17. Further, for example, by using a variable speed reduction mechanism, the rotation speed of the pump 17 may change disproportionally from the operation frequency of the magnetic field modulator 14 and the flow path switching mechanism 18.

Further, in the above described embodiments, the pump 17 is a one-way pump, but this is not limiting. For example, a pump that repeatedly alternates between sucking in and discharging the heat transport medium to pump the heat transport medium back and forth may be used. Further, more than one pump may be used.

Further, in the above described embodiments, the heat transport medium is supplied to the heat exchangers 3, 4 outside of the MHP device 2. Alternatively, a heat exchanger that exchanges heat between the heat transport medium (i.e., the primary medium) and a secondary medium may be disposed within the MHP device 2, and the secondary medium may be supplied to a low temperature system and a high temperature system. In this case, the disclosed techniques may be used by using the secondary medium as the heating target fluid or the cooling target fluid. Further, the flow rate of the secondary medium circulating in the low temperature system and circulating in the high temperature system may be fixed or may change in relation to the flow rate of the heat transport medium. In addition, the disclosed technique may be used for controlling the flow rates of the cooling target fluid, which is cooled by heat exchange with the secondary medium at the low temperature heat exchanger, and the heating target fluid, which is heated by heat exchange with the secondary medium at the high temperature heat exchanger.

Further, in the above described embodiments, a magnetic heat pump device for a vehicular air conditioning device is used. However, this is not limiting. For example, a magnetic heat pump device for an air conditioning device of a moving body other than a vehicle, such as ships or planes, may be used. Further, for example, a magnetic heat pump device for a residential or fixed air conditioning device may be used.

Further, in the above described embodiments, the heating target fluid and the cooling target fluid is air, but this is not limiting. The heating target fluid and the cooling target fluid may be fluids other than air. Further, the heating target fluid and the cooling target fluid may be liquid as well. For example, a magnet heat pump device for a water supply device where the heating target fluid is water may be used.

Further, in the above described embodiments, a configuration where an element bed includes the working chamber 11 and the MCE element 12 is used. However, instead of this, various configurations may be used, such as a configuration where the element bed may rotate relative to the magnetic field modulator 14, or a configuration where the element bed may rotate relative to the flow path switching mechanism 18. For example, by fixing the element bed, a magnetic field modulator including a permanent magnet may be rotated with respect to the element bed.

The invention claimed is:

1. A magnetic heat pump device, comprising:
   a magnetocaloric element disposed between a hot end and a cold end of a working chamber, the magnetocaloric element generating a hot heat and a cold heat according to changes in an external magnetic field;
   a magnetic field modulator that regulates the external magnetic field applied to the magnetocaloric element;
   a heat transport device that circulates a heat transport medium which exchanges heat with the magnetocaloric element so as to form the hot end and the cold end;
   a high temperature heat exchanger that uses a hot heat output from the hot end of the working chamber, which is a portion of a thermal output from the working chamber, to heat a heating target fluid by exchanging heat with the heat transport medium;
   a high temperature flow rate regulator that regulates a flow rate of the heating target fluid in the high temperature heat exchanger;
   a low temperature heat exchanger, providing cooling from the cold end of the working chamber, to cool a cooling target fluid by exchanging heat with the heat transport medium;
   a low temperature flow rate regulator that regulates a flow rate of the cooling target fluid in the low temperature heat exchanger; and
   a controller that controls an operation of the magnetic field modulator, the heat transport device, the high temperature flow rate regulator, and the low temperature flow rate regulator, wherein
   the controller includes
      a characteristic information acquisition unit that obtains a characteristic information of the thermal output with respect to a temperature difference between the hot end and the cold end, and
      a flow rate controller that, when increasing the thermal output, controls the high temperature flow rate regulator and the low temperature flow rate regulator based on the characteristic information obtained by the characteristic information acquisition unit to change at least one of the flow rate of the heating target fluid in the high temperature heat exchanger and the flow rate of the cooling target fluid in the low temperature heat exchanger, such that the temperature difference changes in a direction that increases the thermal output.

2. The magnetic heat pump device of claim 1, wherein the flow rate controller further includes a flow rate increasing unit that, when increasing the thermal output, if it is determined based on the characteristic information obtained by the characteristic information acquisition unit that the temperature difference is in a first characteristic region where the thermal output decreases as the temperature difference increases, increases at least one of the flow rate of the heating target fluid in the high temperature heat exchanger and the flow rate of the cooling target fluid in the low temperature heat exchanger, and a flow rate decreasing unit that, when increasing the thermal output, if it is determined based on the characteristic information obtained by the characteristic information acquisition unit that the temperature difference is in a second characteristic region where the thermal output increases as the temperature difference increases, decreases at least one of the flow rate of the heating target fluid in the high temperature heat exchanger and the flow rate of the cooling target fluid in the low temperature heat exchanger.

3. The magnetic heat pump device of claim 1, wherein the controller further includes a memory unit that stores the characteristic information, and the characteristic information acquisition unit is configured to obtain the characteristic information which is pre-stored in the memory unit.

4. The magnetic heat pump device of claim 1, wherein the controller further includes a characteristic detection unit that detects the characteristic information based on a change in the thermal output when at least one of the flow rate of the heating target fluid in the high temperature heat exchanger and the flow rate of the cooling target fluid in the low temperature heat exchanger is changed, and the characteristic information acquisition unit is configured to obtain the characteristic information detected by the characteristic detection unit.

5. The magnetic heat pump device of claim 1, further comprising:

an air conditioning case that forms therein a ventilation passage for air to be blown into a cabin, the low temperature heat exchanger being disposed in the ventilation passage; and wherein the low temperature flow rate regulator includes an air delivery device disposed in the ventilation passage, the air delivery device configured to regulate an air volume ratio between an amount of air passing through the low temperature heat exchanger and an amount of air bypassing the low temperature heat exchanger.

6. The magnetic heat pump device of claim 1, further comprising:

a pair of high temperature sensors that detect a temperature of the heat transport medium before and after heat exchange with the heating target fluid at the high temperature heat exchanger; and a pair of low temperature sensors that detect a temperature of the heat transport medium before and after heat exchange with the cooling target fluid at the low temperature heat exchanger.

7. The magnetic heat pump device of claim 1, wherein one of the high temperature heat exchanger and the low temperature heat exchanger is an internal heat exchanger disposed in an interior, an internal secondary fluid flowing through the internal heat exchanger, the internal secondary fluid being the heating target fluid or the cooling target fluid, an other of the high temperature heat exchanger and the low temperature heat exchanger is an external heat exchanger disposed in an exterior, an external secondary fluid flowing through the external heat exchanger, the external secondary fluid being the heating target fluid or the cooling target fluid, the controller further includes a startup operation unit that activates the magnetic field modulator and the heat transport device and performs a startup operation until reaching steady operation, and the startup operation unit circulates the external secondary fluid and controls a flow rate of the internal secondary fluid such that the circulation of the internal secondary fluid is stopped or the flow rate of the internal secondary fluid is lower than during the steady operation.

8. The magnetic heat pump device of claim 7, wherein the controller further includes an operation transition unit that transitions from the startup operation to the steady operation when, while the startup operation unit is performing the startup operation, the temperature difference between the hot end and the cold end exceeds a temperature difference between the internal secondary fluid and the external secondary fluid.

9. A magnetic heat pump device, comprising:

a magnetocaloric element disposed between a hot end and a cold end of a working chamber, the magnetocaloric element generating a hot heat and a cold heat according to changes in an external magnetic field;

a magnetic field modulator configured to modulate the external magnetic field applied to the magnetocaloric element;

a heat pump circuit including a pump configured to circulate a heat transport medium which exchanges heat with the magnetocaloric element so as to form the hot end and the cold end;

a high temperature heat exchanger that uses a hot heat output from the hot end of the working chamber, which is a portion of a thermal output from the working chamber, to heat a heating target fluid by exchanging heat with the heat transport medium;

a low temperature heat exchanger, providing cooling from the cold end of the working chamber, to cool a cooling target fluid by exchanging heat with the heat transport medium;

an external fan, a ventilator and air mix doors configured to regulate a flow rate of the heating target fluid in the high temperature heat exchanger, and regulate a flow rate of the cooling target fluid in the low temperature heat exchanger; and a processor configured to control an operation of the magnetic field modulator, the heat pump circuit, the external fan, the ventilator and the air mix doors, wherein the processor is programmed to:

obtain a characteristic information of the thermal output with respect to a temperature difference between the hot end and the cold end, and when increasing the thermal output, control the external fan, the ventilator and the air mix doors based on the characteristic information of the thermal output to change at least one of the flow rate of the heating target fluid in the high temperature heat exchanger and the flow rate of the cooling target fluid in the low temperature heat exchanger, such that the temperature difference changes in a direction that increases the thermal output.

* * * * *